US012562780B2

(12) United States Patent
Choi

(10) Patent No.: US 12,562,780 B2
(45) Date of Patent: Feb. 24, 2026

(54) METHOD OF OPERATING NFC DEVICE AND NFC DEVICE PERFORMING THE SAME

(71) Applicant: SAMSUNG ELECTRONICS CO., LTD., Suwon-si (KR)

(72) Inventor: Jaehun Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 255 days.

(21) Appl. No.: 18/388,709

(22) Filed: Nov. 10, 2023

(65) Prior Publication Data

US 2024/0291517 A1 Aug. 29, 2024

(30) Foreign Application Priority Data

Feb. 27, 2023 (KR) ........................ 10-2023-0026170

(51) Int. Cl.
*H04B 5/24* (2024.01)

(52) U.S. Cl.
CPC ..................................... *H04B 5/24* (2024.01)

(58) Field of Classification Search
CPC .......... H04B 5/24; H04B 5/77; H04B 1/1638; H04B 5/70; H04B 5/72; H04B 14/046; G06K 7/10297; G06K 19/0723; G06K 19/0724; H04L 1/0059; H04L 25/03987; H04L 25/022; H04L 63/0428; H04L 27/2695; H04L 1/0061; H04L 1/203;

H04L 1/0083; H04L 2025/03789; H04L 2025/0349; H04L 25/03006; H04L 1/065; H04L 2025/03375; H03M 7/30; H04W 4/80

See application file for complete search history.

(56) References Cited

U.S. PATENT DOCUMENTS

| | | | |
|---|---|---|---|
| 9,143,201 B2 | 9/2015 | Sung | |
| 9,860,017 B2 | 1/2018 | Sung | |
| 10,148,322 B2 | 12/2018 | Zhu et al. | |
| 10,148,475 B1 | 12/2018 | Jongsma | |
| 10,389,556 B2 | 8/2019 | Choi et al. | |

(Continued)

FOREIGN PATENT DOCUMENTS

KR 10-2011-0026681 A 3/2011

*Primary Examiner* — Lana N Le

(74) *Attorney, Agent, or Firm* — Sughrue Mion, PLLC

(57) ABSTRACT

A method of operating a near field communication (NFC) device includes generating a first and a second digital signal based on an analog input signal respectively received from an external device through a first channel and a second channel having a phase difference with the first channel, generating first decoded data by decoding the first digital signal based on a plurality of first convolution result values, generating second decoded data by decoding the second digital signal based on a plurality of second convolution result values, generating first convolution result data based on the plurality of first convolution result values, generating second convolution result data based on the plurality of second convolution result values, selecting a transmission channel from among the first channel and the second channel based on the first and second decoded data, and the first and second convolution result data, and performing communication with the external device based on the transmission channel.

16 Claims, 21 Drawing Sheets

(56) References Cited

U.S. PATENT DOCUMENTS

| | | | |
|---|---|---|---|
| 11,070,253 | B2 | 7/2021 | Choi |
| 11,171,676 | B2 | 11/2021 | Muehlmann et al. |
| 2013/0257598 | A1* | 10/2013 | Kawaguchi .............. H04B 5/77 |
| | | | 340/10.2 |
| 2017/0288736 | A1* | 10/2017 | Zhou ........................ H04B 5/72 |
| 2022/0327341 | A1* | 10/2022 | Schwar .................. H04W 4/80 |
| 2022/0337266 | A1 | 10/2022 | Choi |
| 2024/0119240 | A1* | 4/2024 | Steinbauer ......... G06K 7/10297 |

* cited by examiner

| Protocol Type | First Pattern |
|---|---|
| Type A | SOF1 (& 1 byte of Payload Data) |
| Type B | SOF2 (& 1 byte of Payload Data) |
| Type F | SOF3(Sync) (& 1 byte of Payload Data) |
| Type V | SOF4 (& 1 byte of Payload Data) |

| SOF | Payload Data | CRC | EOF |

Start pattern:
received 1 byte of Payload Data : received

| Preamble | SOF | Payload Data | CRC | EOF |

Start Of Frame : received

| Preamble | Sync | Length | Payload Data | CRC |
|----------|------|--------|--------------|-----|

Sync : received

| SOF | Payload Data | CRC | EOF |
|-----|--------------|-----|-----|

24 Pulses    8 Pulses

Start Of Frame : received

| | CRM [X-7] | CRM [X-6] | CRM [X-5] | CRM [X-4] | CRM [X-3] | CRM [X-2] | CRM [X-1] | CRM [X] |
|---|---|---|---|---|---|---|---|---|
| CRM | 102 | 103 | 101 | 99 | 101 | 99 | 102 | 101 |
| CRM_ACCUM | 102 | 205 | 306 | 405 | 506 | 605 | 707 | 808 |

CRD_I(= CRM_AVG)   101

| Preamble | SOF | Payload Data | CRC | EOF |
|---|---|---|---|---|

CRM[X-K]  CRM[X-(K-2)]    CRM[X-2]  CRM[X]

CRM[X-(K-1)]  CRM[X-(K-3)]  CRM[X-1]

METHOD OF OPERATING NFC DEVICE AND NFC DEVICE PERFORMING THE SAME

CROSS-REFERENCE TO RELATED APPLICATIONS

This application claims priority under 35 U.S.C. § 119 to Korean Patent Application No. 10-2023-0026170, filed on Feb. 27, 2023, in the Korean Intellectual Property Office, the disclosure of which is incorporated by reference herein in its entirety.

BACKGROUND

The present disclosure relates to wireless communication technologies, and more particularly, to a method of operating a near field communication (NFC) device and an NFC device performing the method.

An NFC device is a contactless communication device that uses a frequency band of about 13.56 megahertz (MHz) and may have a communication range of about 10 centimeters (cm) to about 1 meter (m). The NFC device may be in compliance with one or more communication standards and may operate in one of a card emulation mode, a reader mode, and a peer-to-peer (P2P) mode.

In the card emulation mode, the NFC device is emulated as an NFC card so as to be able to communicate with an external NFC reader. In the reader mode, the NFC device may perform one-way communication with another NFC device, NFC tag, and/or NFC sticker. In the P2P mode, the NFC device may perform two-way communication with another NFC device.

Nowadays, the use of mobile payments and/or electronic payments as an alternative to traditional payment models is increasing. As a result, the importance of the reader mode of the NFC device is being emphasized, and techniques for improving reception performance while the NFC device operates in the reader mode are being studied.

SUMMARY

One or more example embodiments of the present disclosure provide a method of operating an NFC device such that reception performance of the NFC device may be improved.

Further, one or more example embodiments of the present disclosure provide an NFC device performing the method.

According to an aspect of the present disclosure, a method of operating an NFC device includes generating a first digital signal based on an analog input signal received from an external device through a first channel, and generating a second digital signal based on the analog input signal received from the external device through a second channel having a phase difference with the first channel; generating first decoded data by decoding the first digital signal based on a plurality of first convolution result values obtained by performing a first convolution operation on the first digital signal and each of a plurality of first sub-filter coefficients; generating second decoded data by decoding the second digital signal based on a plurality of second convolution result values obtained by performing a second convolution operation on the second digital signal and each of a plurality of second sub-filter coefficients; generating first convolution result data based on the plurality of first convolution result values; generating second convolution result data based on the plurality of second convolution result values; selecting a transmission channel from among the first channel and the second channel based on the first decoded data, the second decoded data, the first convolution result data, and the second convolution result data; and performing communication with the external device based on the transmission channel.

According to an aspect of the present disclosure, a method of operating an NFC device includes generating a first digital signal based on an analog input signal received from an external device through a first channel, and generating a second digital signal based on the analog input signal received from the external device through a second channel having a phase difference with the first channel; generating first decoded data by decoding the first digital signal based on a first final matched filter being one of a plurality of first sub-matched filters; generating second decoded data by decoding the second digital signal based on a second final matched filter being one of a plurality of second sub-matched filters; generating first convolution result data based on a first result of selecting a first portion of first matched convolution result values output from the first final matched filter; generating second convolution result data based on a second result of selecting a second portion of second matched convolution result values output from the second final matched filter; selecting a transmission channel from among the first channel and the second channel based on the first decoded data, the second decoded data, the first convolution result data, and the second convolution result data; and performing communication with the external device based on the transmission channel.

According to an aspect of the present disclosure, an NFC device includes a first channel, a second channel, a first receiver, a second receiver, and a channel selector. The first channel is configured to generate a first digital signal based on an analog input signal received from the outside. The second channel has a phase difference with the first channel, and is configured to generate a second digital signal based on the analog input signal. The first receiver is configured to generate first decoded data by decoding the first digital signal based on a plurality of first convolution result values obtained by performing a convolution operation on the first digital signal and each of a plurality of first sub-filter coefficients, and to generate first convolution result data based on the plurality of first convolution result values. The second receiver is configured to generate second decoded data by decoding the second digital signal based on a plurality of second convolution result values obtained by performing the convolution operation on the second digital signal and each of a plurality of second sub-filter coefficients, and to generate second convolution result data based on the plurality of second convolution result values. The channel selector is configured to select a transmission channel from among the first channel and the second channel based on the first decoded data, the second decoded data, the first convolution result data, and the second convolution result data.

Additional aspects may be set forth in part in the description which follows and, in part, may be apparent from the description, and/or may be learned by practice of the presented embodiments.

BRIEF DESCRIPTION OF THE DRAWINGS

The above and other aspects, features, and advantages of certain embodiments of the present disclosure will become apparent from the following description taken in conjunction with the accompanying drawings, in which:

FIG. 3 is a block diagram illustrating a receiving module of FIG. 2, according to an embodiment;

FIG. 5 is a block diagram illustrating a first receiver of FIG. 3, according to an embodiment;

FIG. 7 is a diagram depicting a first pattern of FIG. 6, according to an embodiment;

FIGS. 14 and 15 are diagrams depicting an example of first final convolution result values of FIG. 6, according to an embodiment;

FIG. 16 is a diagram illustrating a first convolution result data of FIG. 6, according to an embodiment;

DETAILED DESCRIPTION

Hereinafter, various embodiments of the present disclosure are described with reference to the accompanying drawings.

Figure 1:
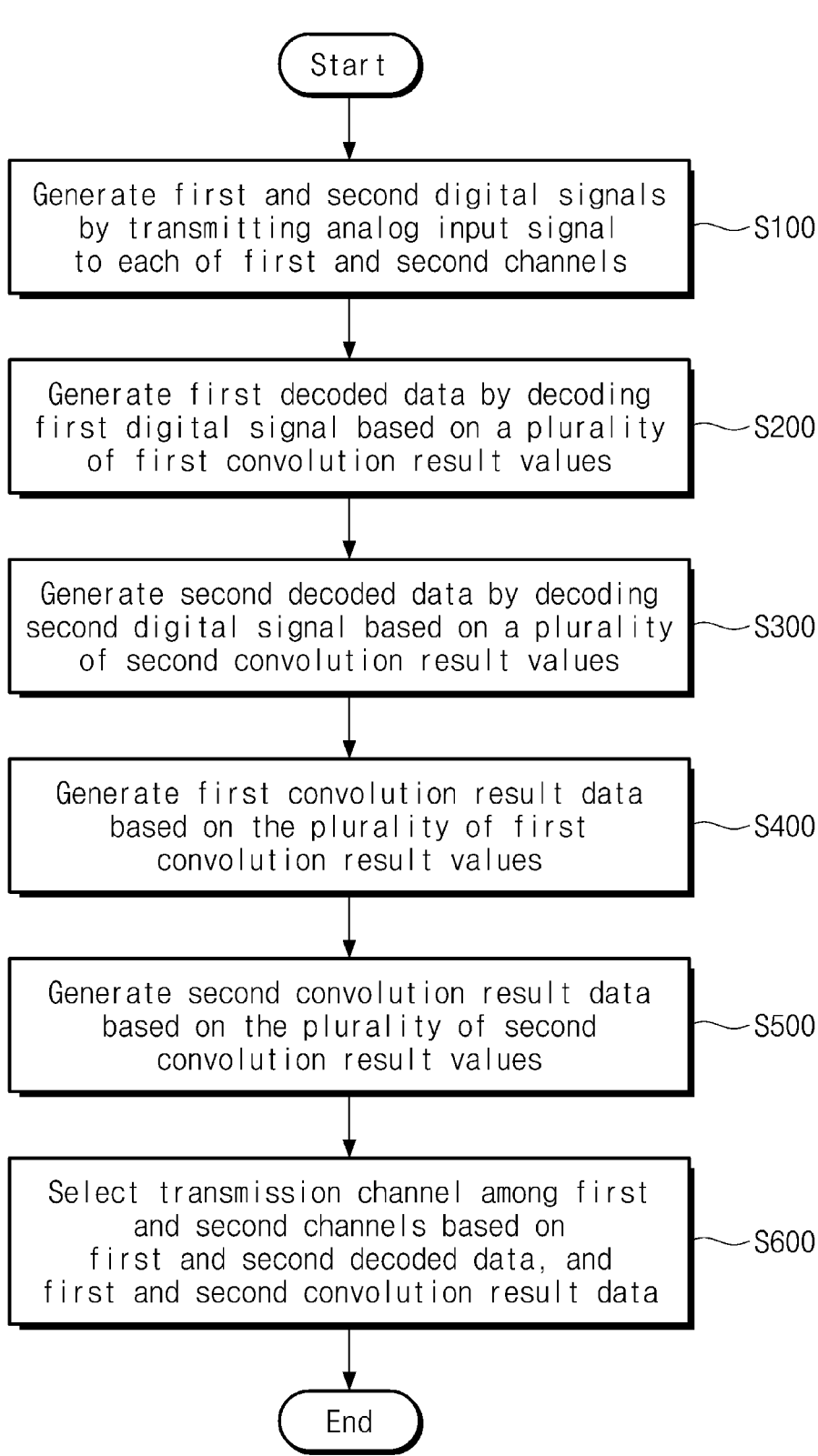
FIG. 1 is a flowchart illustrating a method of operating an NFC device, according to an embodiment.

FIG. 1 is a flowchart illustrating a method of operating a near field communication (NFC) device, according to an embodiment of the present disclosure.

Referring to FIG. 1, in a method of operating an NFC device, the NFC device may generate a first digital signal and a second digital signal from an analog input signal received from the outside through each of a first channel and a second channel (operation S100).

In an embodiment, the NFC device may receive the analog input signal from an external NFC device. The analog input signal may be and/or may include a signal that may have been transmitted from a target device to an initiator device in compliance with an NFC short-range wireless communication standard. The external NFC device may be and/or may include an NFC tag, and the NFC device may be and/or may include an NFC reader. The NFC device, according to an embodiment of the present disclosure, may operate in at least one of a card emulation mode, a reader mode, and a peer-to-peer (P2P) mode, in particular, in the reader mode.

In an embodiment, the analog input signal may be a signal that may be load modulated in at least one of various schemes by the external NFC device for the purpose of performing the NFC short-range wireless communication. For example, the analog input signal may be modulated depending on a protocol type that may conform to one or more wireless communication standards, such as, but not limited to, an International Organization of Standardization (ISO) 14443 standard, and/or an ISO 15693 standard. For example, the analog input signal may be a signal that is obtained by modulating one of a Manchester code or a non-return-to-zero (NRZ) code by using one of an amplitude shift keying (ASK) modulation scheme, an on-off keying (OOK) modulation scheme, or a binary phase shift keying (BPSK) modulation scheme. However, embodiments of the present disclosure are not limited thereto and other modulation schemes may be utilized. For example, the protocol type may include Type A, Type B, Type F, and Type V that may be in compliance with the ISO 14443 standard and/or the ISO 15693 standard. However, embodiments of the present disclosure are not limited thereto, and other protocol types may be used.

In an embodiment, the second channel may have a phase difference with the first channel. For example, the first channel and the second channel may be reception channels for quadrature demodulation. That is, the first channel may be an in-phase channel (e.g., I channel), and the second channel may be a quadrature phase channel (e.g., Q channel). Alternatively, the first channel may be the quadrature phase channel (e.g., Q channel), and the second channel may be the in-phase channel (e.g., I channel).

In an embodiment, each of the first channel and the second channel may include an analog-to-digital converter. For example, the analog input signal may be converted into a baseband signal and converted into a digital signal by the analog-to-digital converter included in the first channel, resulting in a the digital signal that may correspond to the first digital signal. As another example, the analog input signal may be converted into a baseband signal and be converted into a digital signal by the analog-to-digital converter included in the second channel, resulting in a the digital signal that may correspond to the second digital signal.

First decoded data may be generated by decoding the first digital signal based on a plurality of first convolution result values (operation S200). Second decoded data may be generated by decoding the second digital signal based on a plurality of second convolution result values (operation S300).

In an embodiment, the plurality of first convolution result values may be obtained by performing a first convolution operation on the first digital signal and each of a plurality of first sub-filter coefficients, and the plurality of second convolution result values may be obtained by performing a second convolution operation on the second digital signal and each of a plurality of second sub-filter coefficients.

In an embodiment, the decoding of the first digital signal and the decoding of the second digital signal may be performed based on a protocol type used by the NFC device.

First convolution result data may be generated based on the plurality of first convolution result values (operation S400). Second convolution result data may be generated based on the plurality of second convolution result values (operation S500).

In an embodiment, one or more of the plurality of first convolution result values may be selected as first matched convolution result values, and the first convolution result data may be generated based on the first matched convolution result values. One of the plurality of second convolution result values may be selected as second matched convolution result values, and the second convolution result data may be generated based on the second matched convolution result values.

A transmission channel from among the first channel and the second channel may be selected based on the first decoded data, the second decoded data, the first convolution result data, and the second convolution result data (operation S600).

In an embodiment, whether a first pattern is detected in one of the first decoded data and the second decoded data may be determined. For example, when the first pattern is detected in the first decoded data, whether the first pattern is detected from the second decoded data under a given condition may be determined. When the first pattern is detected in both the first decoded data and the second decoded data under the given condition, a magnitude of a value of the first convolution result data and a magnitude of a value of the second convolution result data may be compared.

In an embodiment, the transmission channel may refer to a communication channel selected by the NFC device to perform short-range wireless communication with the external NFC device. For example, the transmission channel may be determined as having relatively high reception performance and/or a relatively high noise cancellation performance compared to another communication channel that has not been selected.

In an embodiment, one of the first channel and the second channel may be selected as the transmission channel. In such an embodiment, the NFC device may perform short-range wireless communication with the external NFC device based on the channel selected as the transmission channel.

As described above, a channel having a better reception performance from among the first channel and the second channel may be selected through the NFC device operating method, according to aspects of the present disclosure.

When a distance between the NFC device and the external NFC device increases above a given level, a signal-to-noise ratio of a signal received from the external NFC device may decrease. In such a case, a noise may be amplified by the quadrature demodulation. However, the NFC device, according to an embodiment of the present disclosure, may reduce the noise amplification when compared to a related NFC device.

The NFC device may select a transmission channel in a digital scheme. For example, the NFC device may select a transmission channel based on a plurality of decoded data and a plurality of convolution result data, thus potentially improving reception performance compared to related schemes for selecting a channel based on a toggle, a preamble, or the like.

Figure 2:
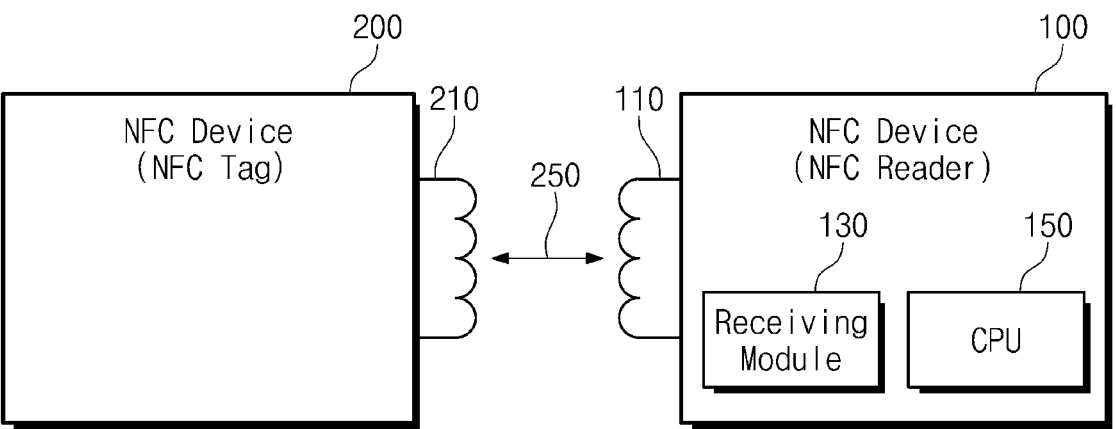
FIG. 2 is a block diagram illustrating an NFC device and an external NFC device communicating with the NFC device, according to an embodiment.

FIG. 2 is a block diagram illustrating an NFC device and an external NFC device communicating with the NFC device, according to an embodiment of the present disclosure.

Referring to FIG. 2, an NFC device 100 may perform short-range wireless communication 250 with an external NFC device 200.

In an embodiment, the NFC device 100 may include an antenna 110, and the external NFC device 200 may include an antenna 210. The NFC device 100 and the external NFC device 200 may perform the short-range wireless communication 250 through inductive coupling by the antennas 110 and 210. For example, when the NFC device 100 comes close (e.g., within a threshold distance) to the external NFC device 200 and/or the NFC device 100 is located within a region having a magnetic field strength of a given range, sub-carriers that have one or more frequencies and are load modulated by the external NFC device 200 may be loaded on a carrier provided by the external NFC device 200 and may be transmitted to the NFC device 100. The analog input signal described with reference to FIG. 1 may be and/or may include a signal that may transmitted from the external NFC device 200 to the NFC device 100.

The NFC device 100 may include a receiving module 130 and a central processing unit (CPU) 150.

In an embodiment, the receiving module 130 may perform the method of operating an NFC device described with reference to FIG. 1 (e.g., operations S100 to S600), and the CPU 150 may perform back-end processing on a plurality of data received through a transmission channel selected by the receiving module 130.

Figure 3:
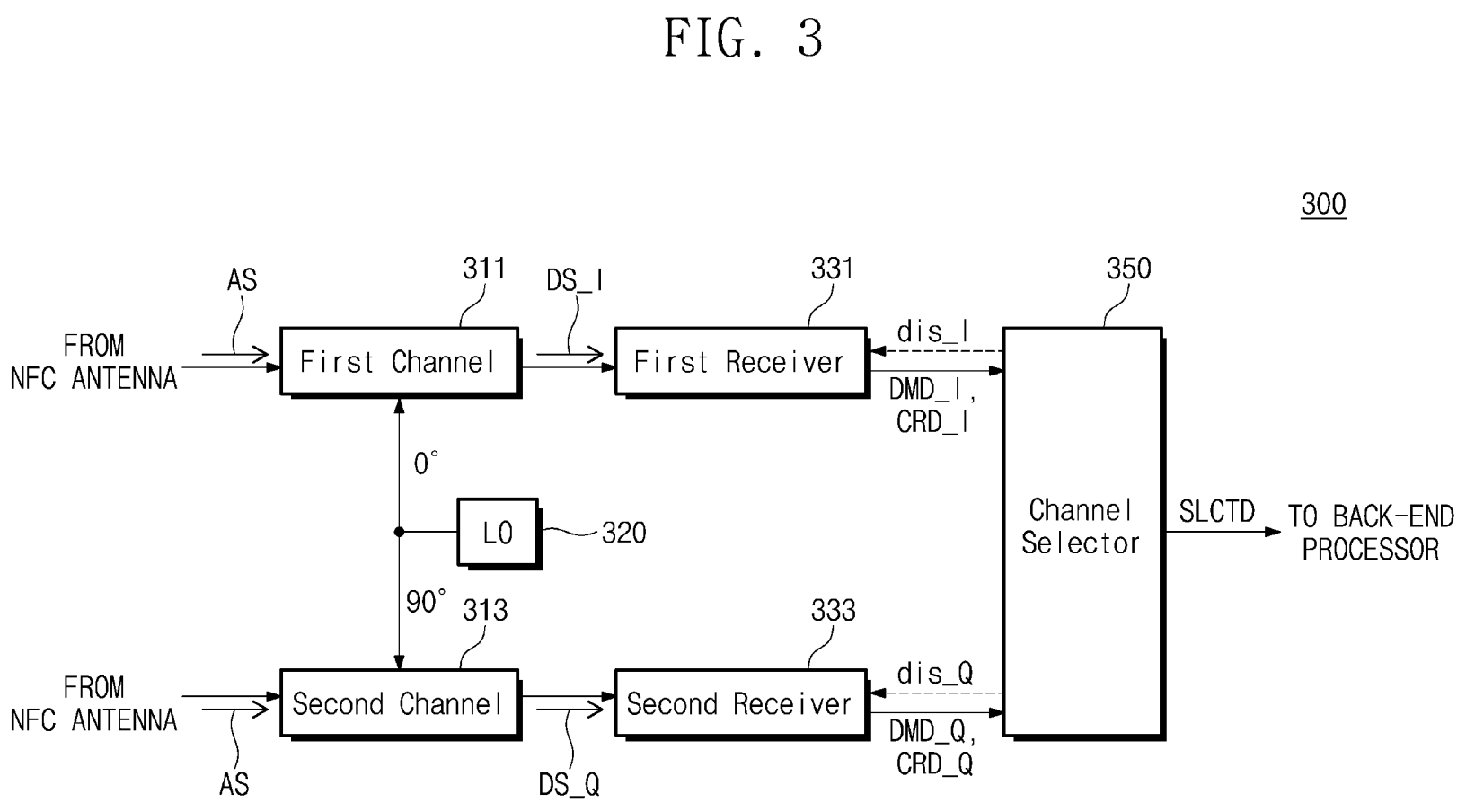

FIG. 3 is a block diagram illustrating a receiving module of FIG. 2, according to an embodiment.

Referring to FIGS. 2 and 3, a receiving module 300 may include a first channel 311, a second channel 313, a local oscillator 320, a first receiver 331, a second receiver 333, and a channel selector 350.

The first channel 311 and the second channel 313 may receive an analog input signal AS from an NFC antenna. The NFC antenna may correspond to the antenna 110 of FIG. 2, and the analog input signal AS may be a signal modulated depending on a type of a protocol that may conform to one or more telecommunication standards, such as, but not limited to, ISO 14443 and ISO 15693.

The first channel 311 may generate a first digital signal DS_I based on the analog input signal AS, and the second channel 313 may generate a second digital signal DS_Q based on the analog input signal AS.

In an embodiment, the second channel 313 may have a phase difference with the first channel 311. For example, the local oscillator 320 may provide oscillation signals of different phases (e.g., 0 degrees (°) and 90°) to the first channel 311 and the second channel 313, respectively. The first channel 311 and the second channel 313 may respectively generate the first digital signal DS_I and the second digital signal DS_Q based on the oscillation signals.

The first receiver 331 may receive the first digital signal DS_I from the first channel 311, and the second receiver 333 may receive the second digital signal DS_Q from the second channel 313.

In an embodiment, the first receiver 331 may generate first decoded data DMD_I and first convolution result data CRD_I based on the first digital signal DS_I. For example, the first receiver 331 may generate a plurality of first convolution result values by performing a convolution operation on the first digital signal DS_I and each of a plurality of first sub-filter coefficients. The first receiver 331 may generate the first decoded data DMD_I by decoding the first digital signal DS_I based on the plurality of first convolution result values. For example, the first receiver 331 may generate the first convolution result data CRD_I based on the plurality of first convolution result values.

In an embodiment, the second receiver 333 may generate second decoded data DMD_Q and second convolution result data CRD_Q based on the second digital signal DS_Q. For example, the second receiver 333 may generate a plurality of second convolution result values by performing a convolution operation on the second digital signal DS_Q each of a plurality of second sub-filter coefficients. The second receiver 333 may generate the second decoded data DMD_Q by decoding the second digital signal DS_Q based on the plurality of second convolution result values. For example, the second receiver 333 may generate the second convolution result data CRD_Q based on the plurality of second convolution result values.

The channel selector 350 may select a transmission channel from among the first channel 311 and the second channel 313 based on the first decoded data DMD_I, the second decoded data DMD_Q, the first convolution result data CRD_I, and the second convolution result data CRD_Q.

In an embodiment, the channel selector 350 may output a disable signal (e.g., dis_I and dis_Q) to at least one of the first receiver 331 and the second receiver 333 in order to reduce power consumption of the NFC device. For example, when the first channel 311 is selected as the transmission channel, the channel selector 350 may output the disable signal dis_Q to the second receiver 333, and when the second channel 313 is selected as the transmission channel, the channel selector 350 may output the disable signal dis_I to the first receiver 331.

In an embodiment, the channel selector 350 may output one of the first decoded data DMD_I and the second decoded data DMD_Q as selected data SLCTD, based on a result of selecting the transmission channel. The selected data SLCTD may be output to a back-end processor (e.g., CPU 150 of FIG. 2). In an optional or additional embodiment, the back-end processor may perform detection and correction of errors that may be present in the selected data SLCTD.

Figure 4:
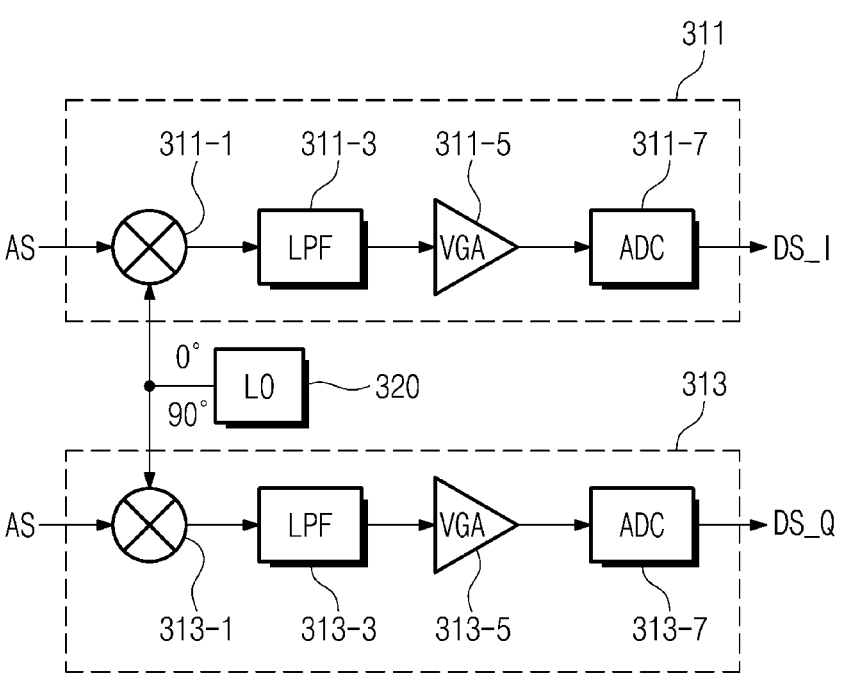
FIG. 4 is a block diagram illustrating a first channel, a second channel, and a local oscillator of FIG. 3, according to an embodiment.

FIG. 4 is a block diagram illustrating a first channel, a second channel, and a local oscillator of FIG. 3, according to an embodiment.

The first channel 311, the second channel 313, and the local oscillator 320 of FIG. 3 are illustrated in FIG. 4. Referring to FIGS. 3 and 4, the first channel 311 may include a mixer 311-1, a low pass filter 311-3, a variable gain amplifier 311-5, and an analog-to-digital converter 311-7. The second channel 313 may include a mixer 313-1, a low pass filter 313-3, a variable gain amplifier 313-5, and an analog-to-digital converter 313-7.

The mixers 311-1 and 313-1 may convert the analog input signal AS into baseband signals based on the oscillation signals provided from the local oscillator 320. The low pass filters 311-3 and 313-3 may remove noise components present in a high band by performing low pass filtering on the baseband signals. The variable gain amplifiers 311-5 and 313-5 may amplify signals output from the low pass filters 311-3 and 313-3, and the analog-to-digital converters 311-7 and 313-7 may convert signals output from the variable gain amplifiers 311-5 and 313-5 into the digital signals DS_I and DS_Q.

Figure 5:
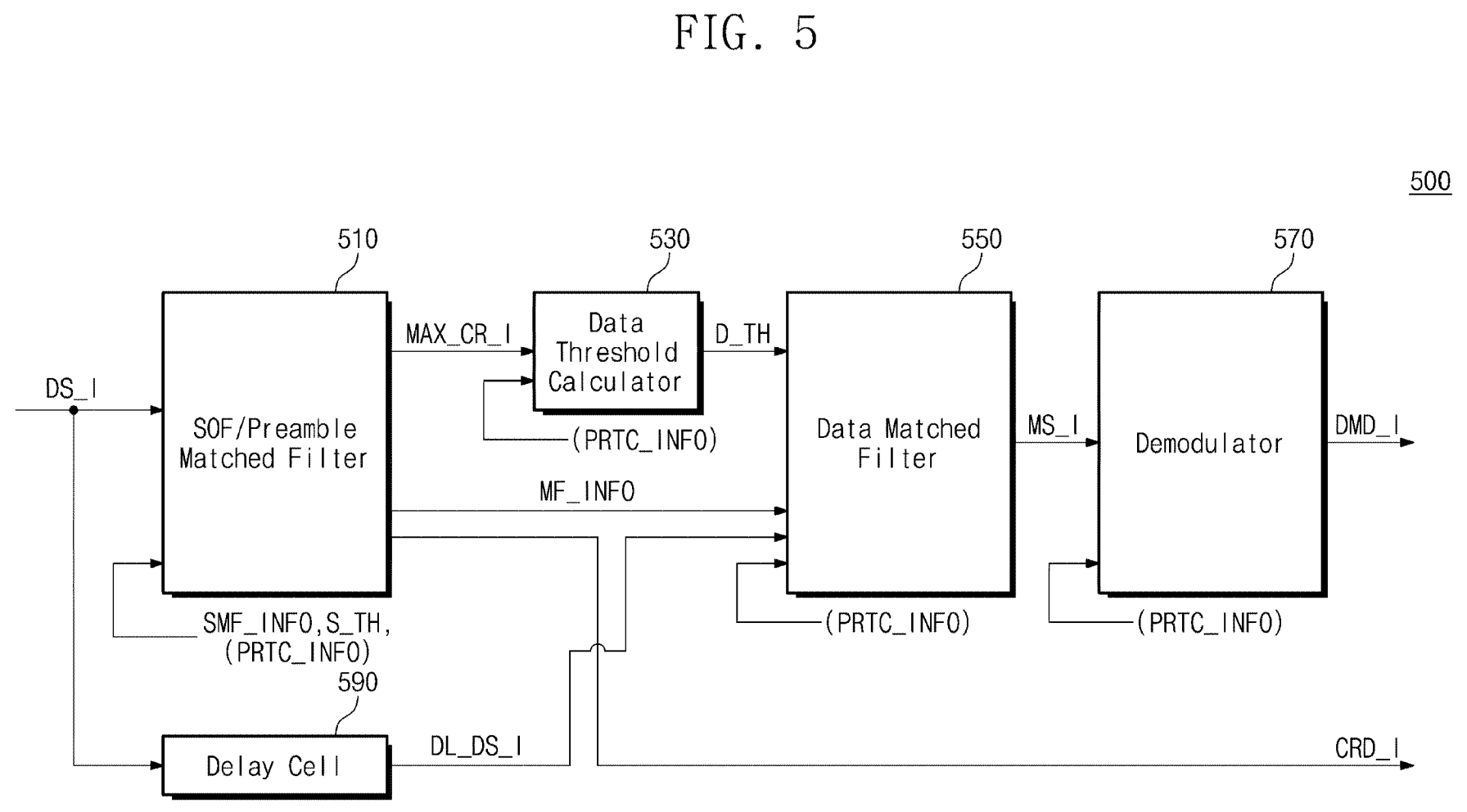

FIG. 5 is a block diagram illustrating a first receiver of FIG. 3, according to an embodiment.

Referring to FIGS. 3 and 5, a first receiver 500 may include a start pattern/preamble matched filter 510, a data threshold calculator 530, a data matched filter 550, a demodulator 570, and a delay cell 590.

The start pattern/preamble matched filter 510 may receive the first digital signal DS_I from the first channel 311 and may further receive sub-matched filter information SMF_INFO and a threshold value S_TH. The sub-matched filter information SMF_INFO may include a plurality of first sub-filter coefficients. The start pattern/preamble matched filter 510 may generate the first convolution result data CRD_I based on the first digital signal DS_I, the sub-matched filter information SMF_INFO, and the threshold value S_TH.

In an embodiment, the start pattern/preamble matched filter 510 may generate a plurality of first convolution result values by performing the convolution operation on the first digital signal DS_I for each of the plurality of first sub-filter coefficients. The start pattern/preamble matched filter 510 may include a plurality of first sub-matched filters for the convolution operation. For example, the plurality of first sub-filter coefficients may be respectively input to the plurality of first sub-matched filters, and the plurality of first sub-matched filters may respectively output the plurality of first convolution result values. The start pattern/preamble matched filter 510 may determine one of the plurality of first sub-matched filters as a first final matched filter, based on the plurality of first convolution result values and the threshold value S_TH. The convolution result values output from the first final matched filter may be referred to as first matched convolution result values. The start pattern/preamble matched filter 510 may determine some (e.g., a portion) of the first matched convolution result values as first final convolution result values and may generate the first convolution result data CRD_I based on the first final convolution result values. For example, the plurality of first convolution result values may indicate magnitudes of sub-carriers respectively corresponding to the plurality of first sub-filter coefficients, and the first final matched filter may be a sub-matched filter indicating a sub-carrier with the greatest (e.g., maximum) magnitude from among the plurality of first sub-matched filters.

The start pattern/preamble matched filter 510 may output the greatest (e.g., maximum) value among the plurality of first convolution result values as a maximum convolution result value MAX_CR_I and may output first final matched filter information MF_INFO indicating the first final matched filter.

The data threshold calculator 530 may receive the maximum convolution result value MAX_CR_I and may output a data threshold value D_TH based on the maximum convolution result value MAX_CR_I.

The delay cell 590 may delay the first digital signal DS_I and may output a first delayed digital signal DL_DS_I. The delay cell 590 may be configured to delay the first digital signal DS_I by a time interval sufficient for the start pattern/preamble matched filter 510 to determine the first final matched filter. That is, the delay cell 590 may output the first delayed digital signal DL_DS_I after a time interval sufficient for the start pattern/preamble matched filter 510 to determine the first final matched filter has elapsed.

The data matched filter 550 may output a first matched signal MS_I based on the data threshold value D_TH, the first final matched filter information MF_INFO, and the first delayed digital signal DL_DS_I.

The demodulator 570 may decode the first matched signal MS_I to generate the first decoded data DMD_I.

In an embodiment, the start pattern/preamble matched filter 510, the data threshold calculator 530, the data matched filter 550, and the demodulator 570 may further receive protocol type information PRTC_INFO about a type of a protocol that the NFC device uses. In such an embodiment, for example, the demodulator 570 may generate the first decoded data DMD_I, and/or the start pattern/preamble matched filter 510 may determine the first convolution result data CRD_I, further based on the protocol type information PRTC_INFO.

Exemplary configurations of the start pattern/preamble matched filter 510 are disclosed in U.S. Patent Application Publication No. 2022/0337266 filed on Nov. 19, 2021, and exemplary configurations of the data matched filter 550 are disclosed in U.S. Pat. No. 9,860,017, issued on Jan. 2, 2018), the disclosures of which are incorporated by reference herein in their entireties. Consequently, the configuration of the start pattern/preamble matched filter 510 will be briefly described in the present disclosure.

In an embodiment, the first receiver 500 may further include a protocol parser. In such an embodiment, the first receiver 500 may receive the sub-matched filter information SMF_INFO, the threshold value S_TH, and the protocol type information PRTC_INFO from the protocol parser. However, the present disclosure is not limited thereto. For example, the first receiver 500 may receive the sub-matched filter information SMF_INFO, the threshold value S_TH, and/or the protocol type information PRTC_INFO from the CPU 150 of FIG. 2.

A configuration of the second receiver 333 of FIG. 3 may be identical and/or similar in many respects to the configuration of the first receiver 500. Accordingly, an operation of the second receiver 333 may be identical and/or similar to the operation of the first receiver 500. Consequently, repeated descriptions of the configuration and/or operation of the second receiver 333 described above with reference to first receiver 500 may be omitted for the sake of brevity.

Figure 6:
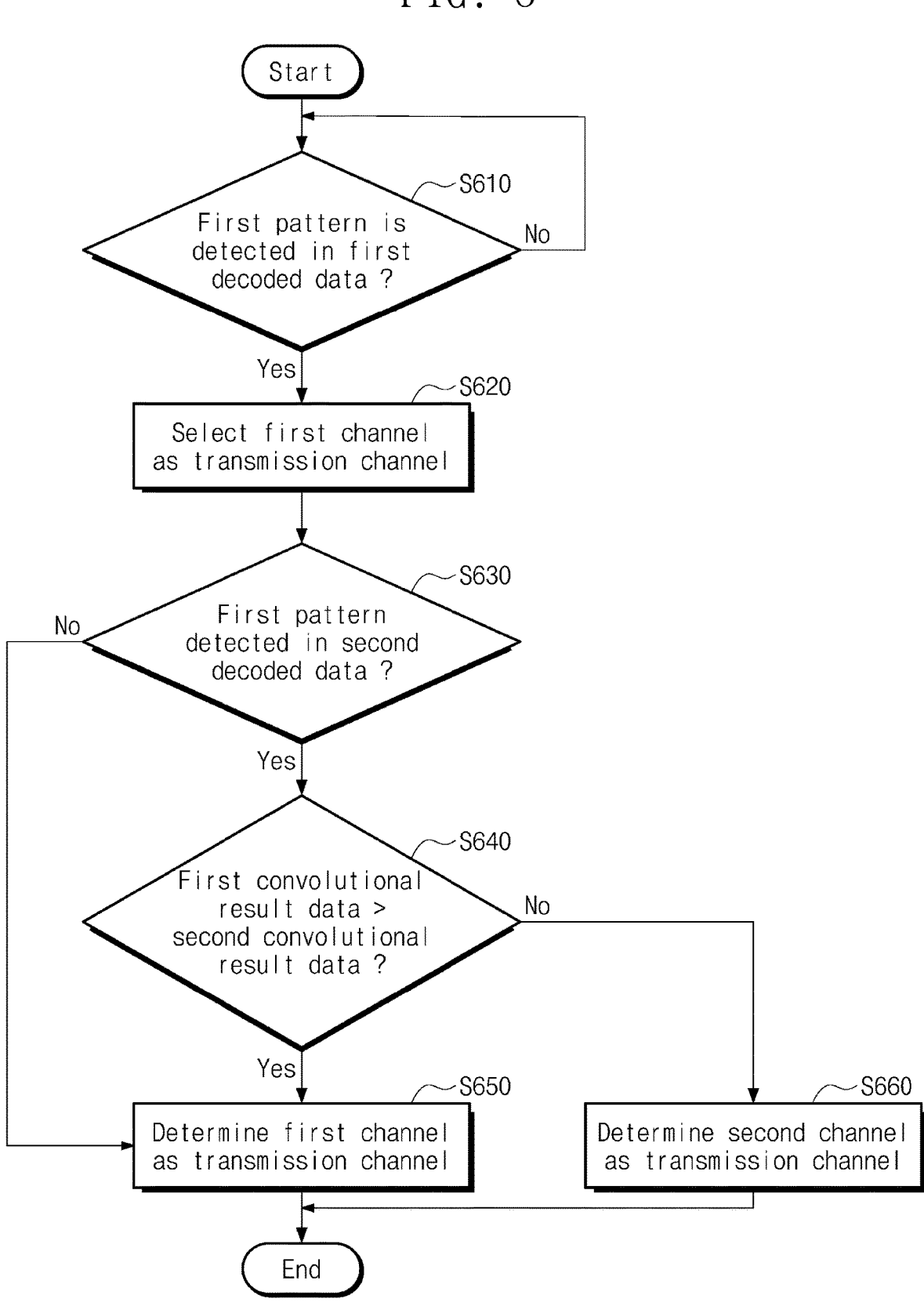
FIG. 6 is a flowchart illustrating an operation of selecting a transmission channel of FIG. 1, according to an embodiment.

FIG. 6 is a flowchart illustrating an operation of selecting a transmission channel of FIG. 1, according to an embodiment.

Referring to FIGS. 1 and 6, operations S610 to S660 of FIG. 6 may be performed as part of performing operation S600 of FIG. 1, in which the transmission channel is selected from among the first channel and the second channel. For example, performing operation S600 may include determining whether the first pattern is detected in the first decoded data (operation S610).

In an embodiment, the first pattern may be determined based on a type of a protocol that an NFC device receiving the analog input signal uses.

In an embodiment, when the first pattern is detected in the first decoded data prior to the second decoded data, the first channel may be selected as the transmission channel (operation S620).

When the first pattern is not detected in the first decoded data (No in operation S610), operation S610 may be repeated. Alternatively or additionally, when the first pattern is detected in the first decoded data, whether the first pattern is detected in the second decoded data within a set time interval may be determined (operation S630).

In an embodiment, the set time interval may start from a point in time when the first pattern is detected from the first decoded data. That is, the set time interval may start at a time point at which the first pattern is detected in the first decoded data.

In an embodiment, when the first pattern is detected in the second decoded data within the set time interval (Yes in operation S630), the value of the first convolution result data and the value of the second convolution result data may be compared (operation S640). For example, when the first pattern is detected in the second decoded data within the set time interval (Yes in operation S630), whether a value of the first convolution result data is greater than a value of the second convolution result data may be determined (operation S640).

When the value of the first convolution result data is greater than the value of the second convolution result data (Yes in operation S640), the first channel may be selected as the transmission channel (operation S650).

When the value of the first convolution result data is smaller than or equal to the value of the second convolution result data (No in operation S640), the second channel may be selected as the transmission channel (operation S660).

In an embodiment, when the first pattern is not detected in the second decoded data within the set time interval (No in operation S630), the first channel may be confirmed as the transmission channel (operation S650).

In an embodiment, operations S610 to S660 may be performed by the channel selector 350 of FIG. 3.

FIG. 7 is a diagram depicting a first pattern of FIG. 6, according to an embodiment.

Referring to FIGS. 6 and 7, the first pattern may be determined based on a type of a protocol that an NFC device receiving the analog input signal uses.

As shown in FIG. 7, the protocol type may include a Type A, a Type B, a Type F, and a Type V. However, the present disclosure is not limited thereto, and the protocol type may include other types. For example, the protocol type may conform with one or more telecommunication standards, such as, but not limited to, ISO 14443, ISO 15693 standard, and the like. In an embodiment, the protocol type may be expanded and/or changed by a revision of a NFC short-range wireless communication standard.

In an embodiment, the first pattern may include a start pattern that may change depending on the protocol type. In another embodiment, the first pattern may further include payload data with a given size depending on the protocol type. The start pattern may indicate a start of the short-range wireless communication between NFC devices and may refer to the entire pattern (or data) received before the payload data and/or a portion thereof.

In an embodiment, when the protocol type is a first type (e.g., Type A), the first pattern may include a first start pattern (e.g., SOF1) and the payload data of the given size (e.g., 1 byte). When the protocol type is a second type (e.g., Type B), the first pattern may include a second start pattern SOF2. When the protocol type is a third type (e.g., Type F), the first pattern may include a third start pattern SOF3. When the protocol type is a fourth type (e.g., Type V), the first pattern may include a fourth start pattern SOF4.

In an embodiment, the first start pattern, the third start pattern, and the fourth start pattern may each include a start of communication pattern, and the second start pattern may include a SYNC pattern. As used herein, the start of communication pattern may be referred to as a start of frame (SOF) pattern.

In an embodiment, in the case of the first type, the first pattern may include the start pattern and the payload data of one byte. Alternatively or additionally, in the case of the second type, the third type, and the fourth type, the first pattern may include only the start pattern.

In an embodiment, as in the first type, the second type, the third type, and the fourth type, the first pattern may further include the payload data of the given size as well as the start pattern.

FIGS. 8A, 8B, 8C, and 8D are diagrams illustrating examples of a first pattern of FIG. 6, according to an embodiment.

Referring to FIGS. 8A, 8B, 8C, and 8D, a plurality of decoded data is shown that complies with types of a protocol that an NFC device uses. The plurality of decoded data of FIGS. 8A to 8D may include and/or may be similar in many respects to one of the first decoded data DMD_I and the second decoded data DMD_Q of FIG. 3.

Figure 8A:
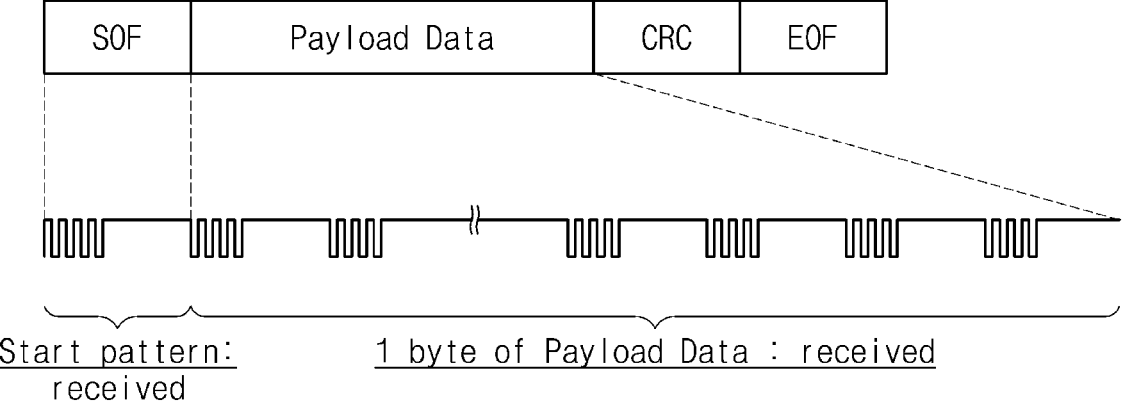
FIGS. 8A, 8B, 8C, and 8D are diagrams illustrating examples of a first pattern of FIG. 6, according to an embodiment.

Referring to FIG. 8A, the decoded data may correspond to the case where the protocol type is the first type (e.g., Type A). As shown in FIG. 8A, the decoded data may include a start pattern (e.g., SOF), payload data, a cyclic redundancy check (CRC) code, and an end of frame (e.g., EOF).

Figure 8B:
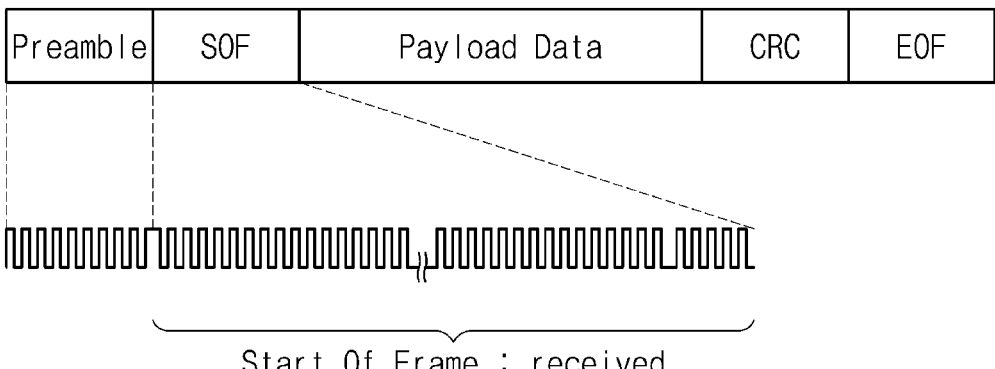

Referring to FIG. 8B, the decoded data may correspond to the case where the protocol type is the second type (e.g., Type B). As shown in FIG. 8B, the decoded data may include a preamble, a start pattern (e.g., SOF), payload data, a CRC code, and an end of frame.

Figure 8C:
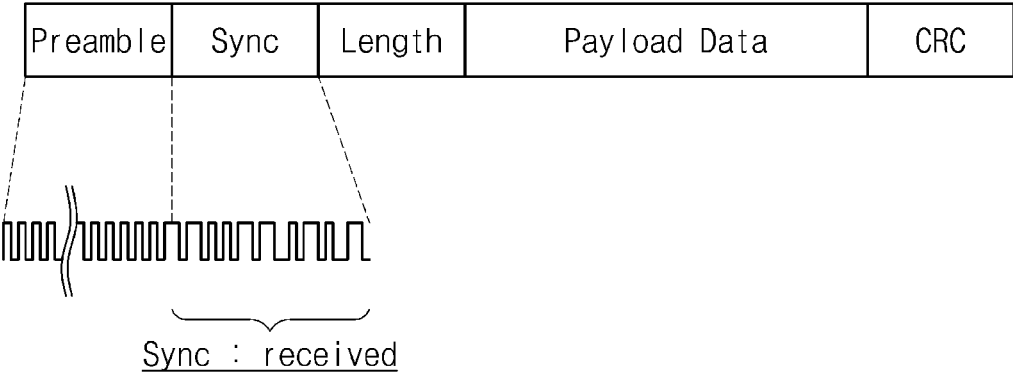

Referring to FIG. 8C, the decoded data may correspond to the case where the protocol type is the third type (e.g., Type F). As shown in FIG. 8C, the decoded data may include a preamble, a SYNC pattern, data length information, payload data, and a CRC code.

Figure 8D:
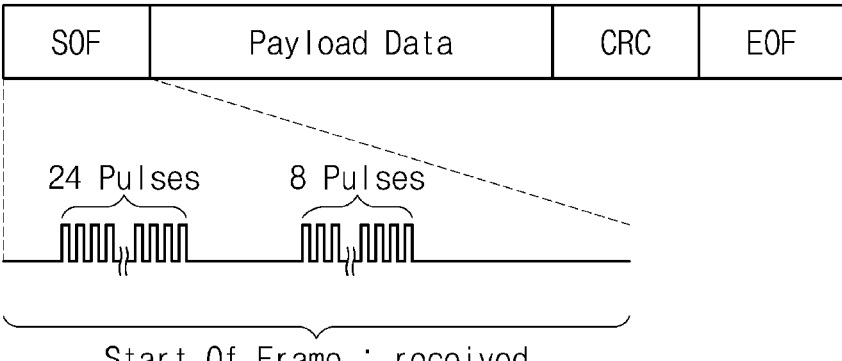

Referring to FIG. 8D, the decoded data may correspond to the case where the protocol type is the fourth type (e.g., Type V). As shown in FIG. 8D, the decoded data may include a start pattern, payload data, a CRC code, and an end of frame.

Referring to FIGS. 6, 7, 8A, 8B, 8C, and 8D, when the protocol is of the first type (e.g., Type A), a channel selector (e.g., channel selector 350 of FIG. 3) may determine that the first pattern is detected when both the start pattern (e.g., SOF) and the payload data of the given size are received by the channel selector. When the protocol is of the second type (e.g., Type B), the channel selector may determine that the first pattern is detected when the start pattern (e.g., SOF) is received by the channel selector. When the protocol is of the third type (e.g., Type F), the channel selector may determine that the first pattern is detected when the SYNC pattern is received by the channel selector. When the protocol is of the fourth type (e.g., Type V), the channel selector may determine that the first pattern is detected when the start pattern (e.g., SOF) is received by the channel selector.

Figure 9:
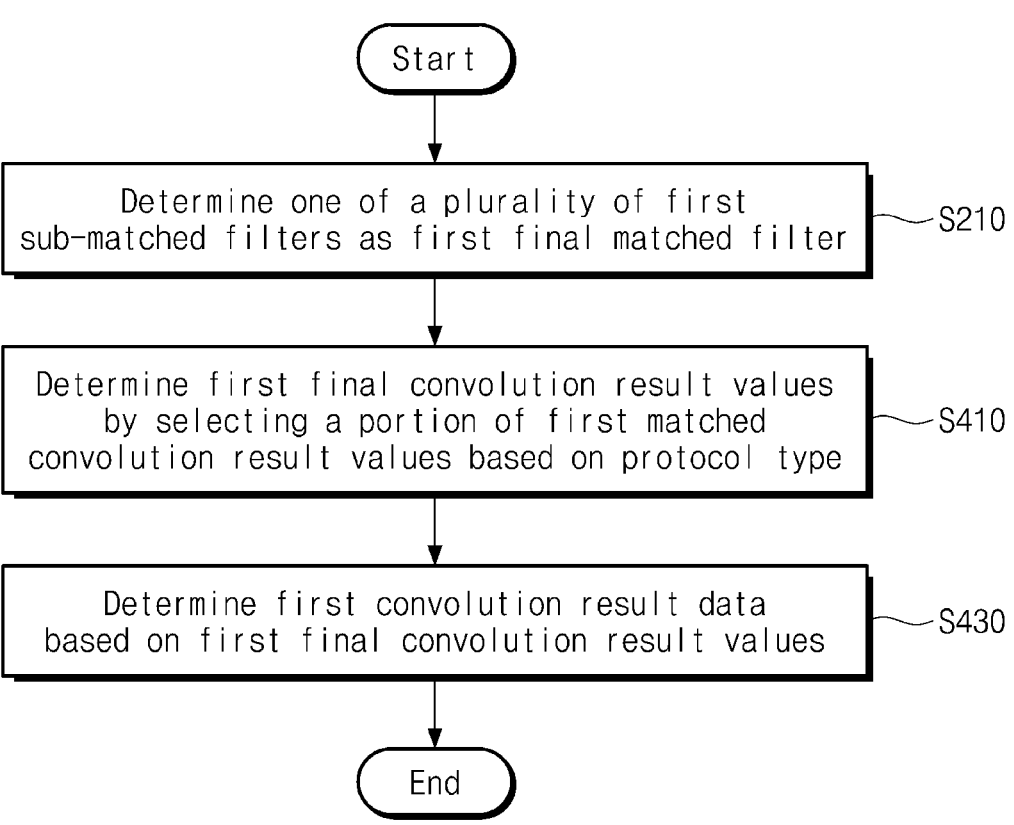
FIG. 9 is a flowchart illustrating an operation of generating first decoded data of FIG. 1 and an operation of generating first convolution result data of FIG. 1, according to an embodiment.

FIG. 9 is a flowchart illustrating an operation of generating first decoded data of FIG. 1 and an operation of generating first convolution result data of FIG. 1, according to an embodiment.

Referring to FIGS. 1 and 9, operation S200, in which the first decoded data is generated, may include determining one of a plurality of first sub-matched filters respectively corresponding to the plurality of first sub-filter coefficients as a first final matched filter based on the plurality of first convolution result values (operation S210). Continuing to refer to FIGS. 1 and 9, operation S400, in which the first convolution result data is generated, may include performing operations S410 and S430.

In an embodiment, the plurality of first sub-filter coefficients may be respectively input to the plurality of first sub-matched filters. The plurality of first sub-matched filters may respectively output the plurality of first convolution result values, and a sub-matched filter corresponding to the greatest (e.g., maximum) value among the plurality of first convolution result values may be determined as the first final matched filter.

First final convolution result values may be determined by selecting some of first matched convolution result values output from the first final matched filter based on a type of a protocol that an NFC device receiving the analog input signal uses (operation S410).

In an embodiment, the first matched convolution result values may refer to convolution result values output from the first final matched filter.

In an embodiment, some of the first matched convolution result values output from the first final matched filter may be selected depending on the protocol type. For example, a start position and an end position of some convolution result values selected from the first matched convolution result values may be determined depending on the protocol type. In an optional or additional embodiment, the number of first matched convolution result values selected from the first matched convolution result values may be determined depending on the protocol type.

The first convolution result data may be generated based on the first final convolution result values (operation S430).

In an embodiment, operation S300, in which the second decoded data is generated, and operation S500, in which the second convolution result data, is generated may be identical and/or may be similar in many respects to operations S200 and S400, respectively. Consequently, operations S300 and S500 may be performed in an identical manner and/or a similar manner to operations S210, S410, and S430. Accordingly, repeated descriptions of operations S300 and S500 described above with reference to operations S210, S410, and S430 may be omitted for the sake of brevity.

Figure 10:
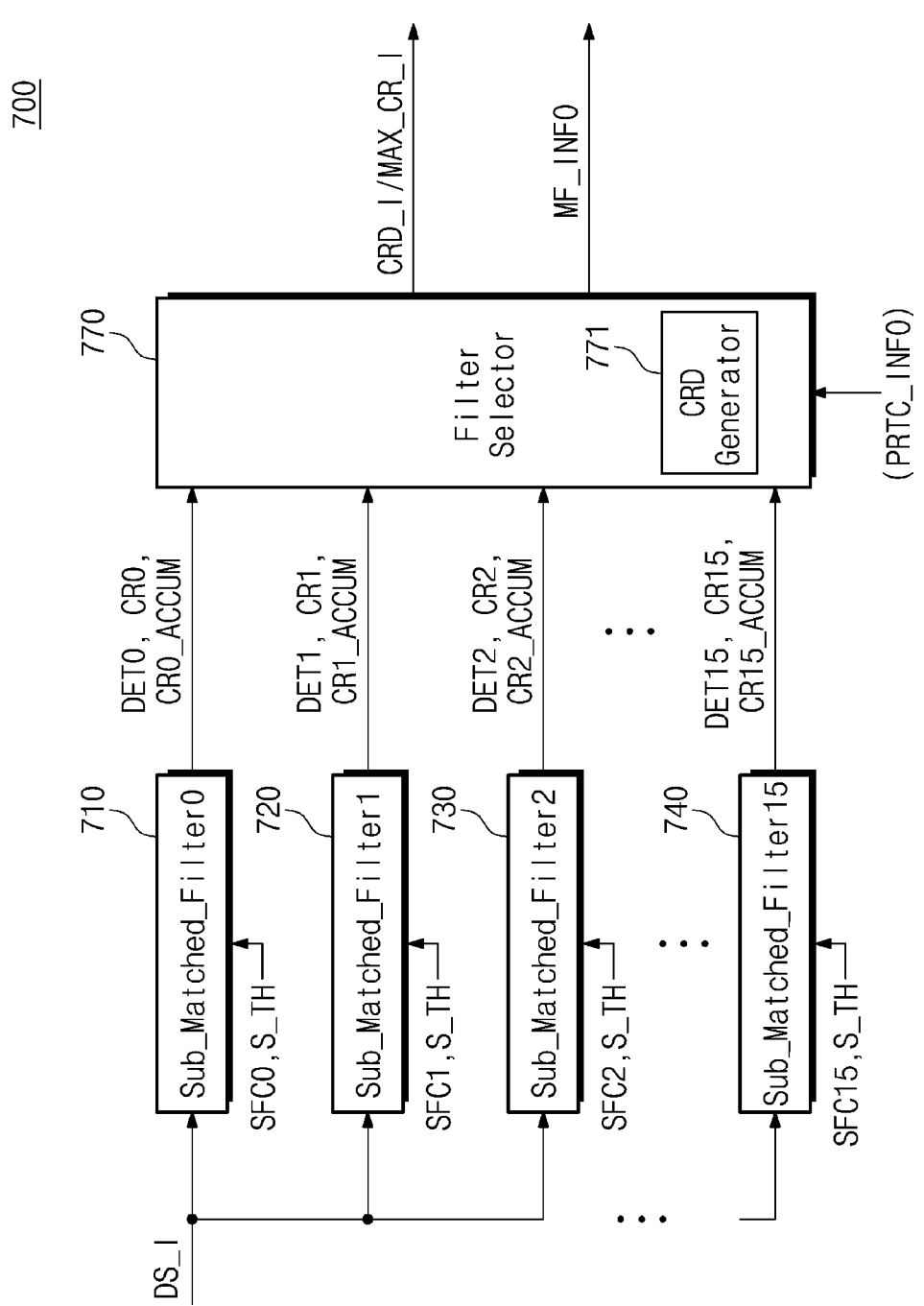
FIG. 10 is a block diagram illustrating a start pattern/preamble matched filter of FIG. 5, according to an embodiment.

FIG. 10 is a block diagram illustrating a start pattern/preamble matched filter of FIG. 5, according to an embodiment.

Referring to FIGS. 5 and 10, a start pattern/preamble matched filter 700 may include a plurality of first sub-matched filters (e.g., first sub-matched filter 710, second sub-matched filter 720, third sub-matched filter 730, to fifteenth sub-matched filter 740) and a filter selector 770. The filter selector 770 may include a convolution result data generator 771. The start pattern/preamble matched filter 700 may include and/or may be similar in many respects to the start pattern/preamble matched filter 510 of FIG. 5, and may include additional features not mentioned above. Consequently, repeated descriptions of the start pattern/preamble matched filter 700 described above with reference to FIG. 5 may be omitted for the sake of brevity.

A plurality of first sub-filter coefficients (e.g., first sub-filter coefficients SFC0, second sub-filter coefficients SFC1, third sub-filter coefficients SFC2, to fifteenth sub-filter coefficients SFC15) may be respectively input to the plurality of first sub-matched filters 710 to 740. In an embodiment, the plurality of first sub-filter coefficients SFC0 to SFC15 may be obtained by continuously phase shifting one filter coefficient by a given magnitude. The plurality of first sub-matched filters 710 to 740 may generate a plurality of first convolution result values (e.g., first convolution result value CR0, second convolution result value CR1, third convolution result value CR2, to fifteenth convolution result value CR15) by performing the convolution operation on the first digital signal DS_I and the plurality of first sub-filter coefficients SFC0 to SFC15. Alternatively or additionally, the plurality of first sub-matched filters 710 to 740 and may generate first accumulated convolution result values (e.g., first accumulated convolution result value CR0_ACCUM, second accumulated convolution result value CR1_ACCUM, third accumulated convolution result value CR2_ACCUM, to fifteenth accumulated convolution result value CR15_ACCUM) by accumulating each of the plurality of first convolution result values CR0 to CR15 the given number of times.

Each of the plurality of first sub-matched filters 710 to 740 may include a comparison circuit and/or may receive a threshold value S_TH. The plurality of first sub-matched filters 710 to 740 may output detection signals (e.g., first detection signal DET0, second detection signal DET1, third detection signal DET2, to fifteenth detection signal DET15) by using the comparison circuits and the threshold value S_TH. Alternatively or additionally, the filter selector 770 may generate the first convolution result data CRD_I based on the detection signals DET0 to DET15, the plurality of first convolution result values CR0 to CR15, and the first accumulated convolution result values CR0_ACCUM to CR15_ACCUM.

In an embodiment, the filter selector 770 may receive the protocol type information PRTC_INFO. The filter selector 770 may determine an accumulation range and the number of times of accumulation that may be used to generate the first accumulated convolution result values CR0_ACCUM to CR15_ACCUM, based on the protocol type information PRTC_INFO. For example, some of the first convolution result values CR0 to CR15 may be selected and accumulated based on the accumulation range and the number of times of accumulation.

In an embodiment, the filter selector 770 may output the greatest (e.g., maximum) value among the plurality of first convolution result values CR0 to CR15 as the maximum convolution result value MAX_CR_I of FIG. 3.

Figure 11:
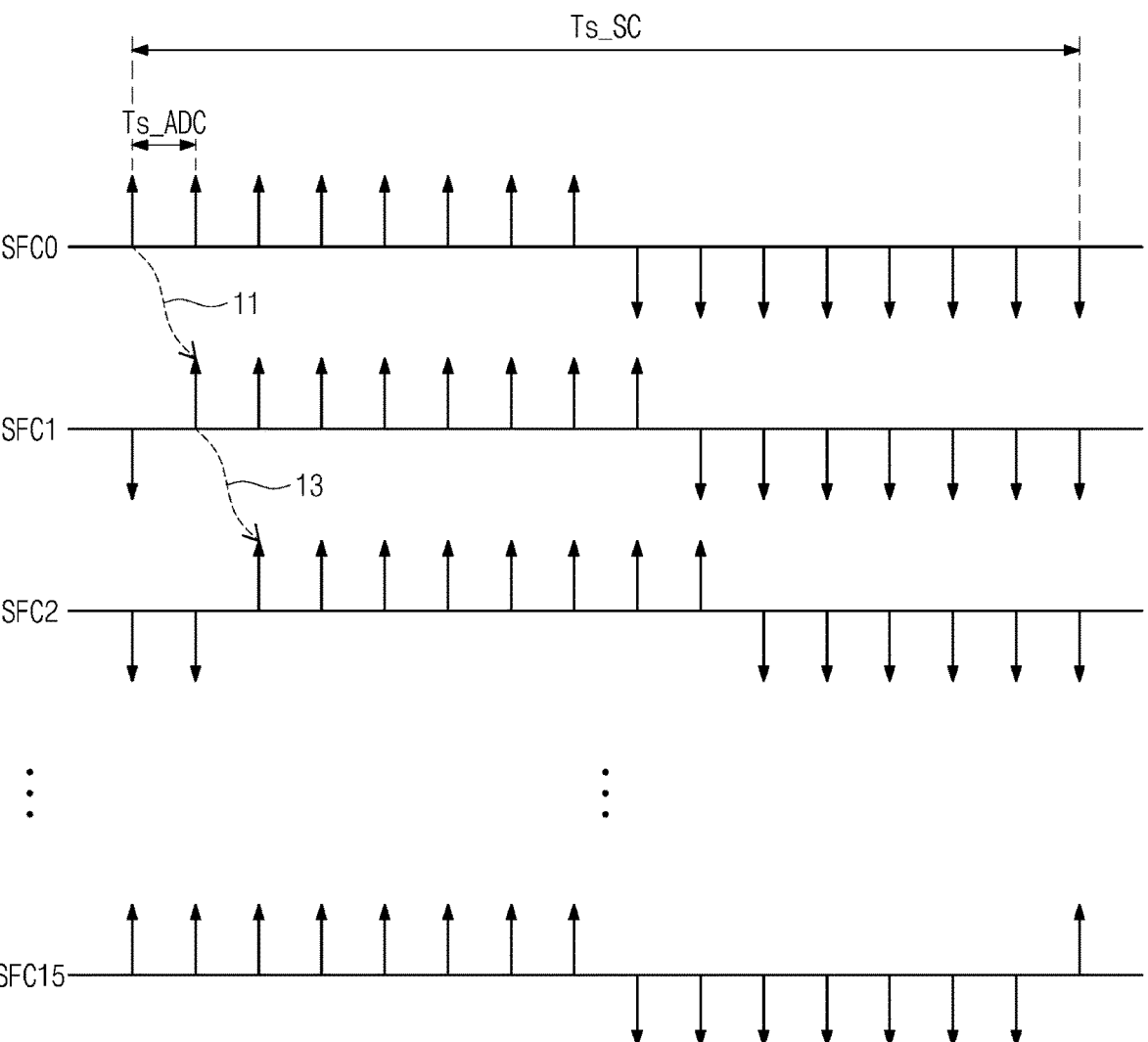
FIG. 11 is a diagram depicting a plurality of first sub-filter coefficients of FIG. 10, according to an embodiment.

FIG. 11 is a diagram depicting a plurality of first sub-filter coefficients of FIG. 10, according to an embodiment.

Referring to FIGS. 10 and 11, arrangements of the sub-filter coefficient SFC0 from among the plurality of first sub-filter coefficients SFC0 to SFC15 may be configured to have an interval corresponding to a sampling period Ts_ADC of an analog-to-digital converter (e.g., analog-to-digital converter 311-7 or 313-7 of FIG. 4) and to have a filter window size corresponding to a sub-carrier period Ts_SC. In an embodiment, the sub-filter coefficient SFC1 may be obtained by phase shifting the arrangements of the sub-filter coefficient SFC0 by a given magnitude (as shown by element 11 of FIG. 11), and the sub-filter coefficient SFC2 may be obtained by phase shifting the arrangements of the sub-filter coefficient SFC1 by the given magnitude that is used to phase shift the sub-filter coefficient SFC0 to the sub-filter coefficient SFC1 (as shown by element 11 of FIG. 13). The remaining sub-filter coefficients (e.g., third sub-filter coefficients SFC3 to fifteenth sub-filter coefficients SFC15) may be obtained in a manner similar to the sub-filter coefficients SFC1 and SFC2.

Figure 12:
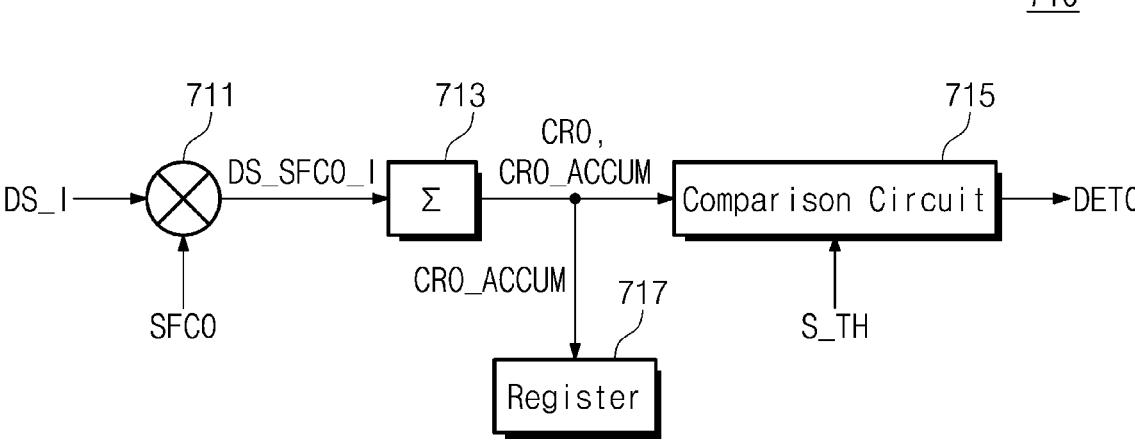
FIG. 12 is a diagram illustrating one of a plurality of sub-matched filters of FIG. 10, according to an embodiment.

FIG. 12 is a diagram illustrating one of a plurality of sub-matched filters of FIG. 10, according to an embodiment.

Referring to FIGS. 10 and 12, a sub-matched filter 710 may include a mixer 711, an adder 713, a comparison circuit 715, and a register 717.

The mixer 711 may mix the first digital signal DS_I and the first sub-filter coefficient SFC0 to output a mixed signal DS_SFC0_I. The adder 713 may add and/or accumulate the mixed signal DS_SFC0_I to output the first convolution result value CR0 and/or the first accumulated convolution result value CR0_ACCUM. The comparison circuit 715 may output the detection signal DET0 based on the first convolution result value CR0, the first accumulated convolution result value CR0_ACCUM, and the threshold value S_TH.

The register 717 may store the first accumulated convolution result value CR0_ACCUM.

Exemplary configurations of the first receiver 500 are disclosed in U.S. Patent Application No. 2022/0337266, filed on Nov. 19, 2021, the disclosure of which is incorporated by reference herein in its entirety.

Figure 13:
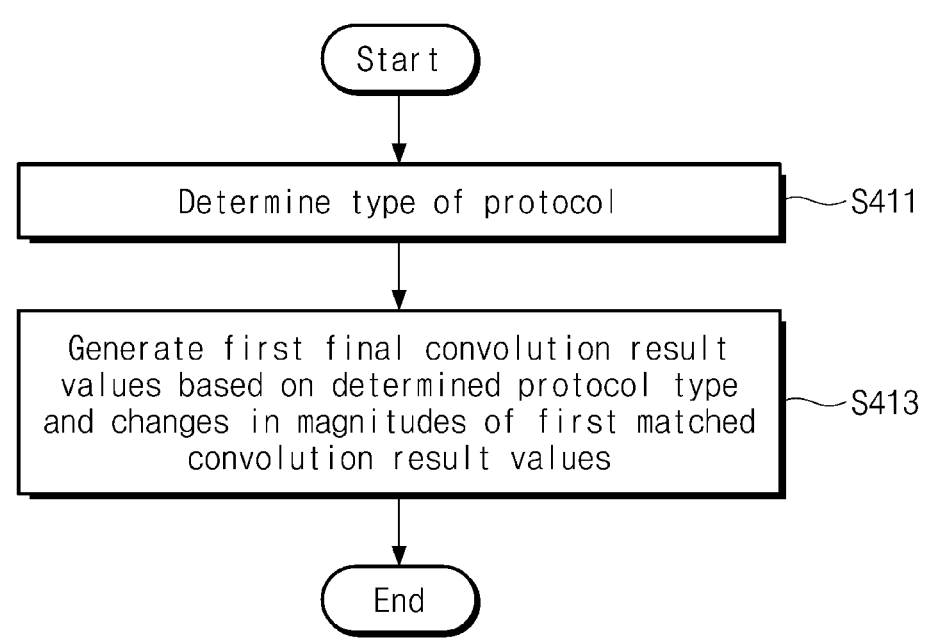
FIG. 13 is a flowchart illustrating an operation of determining first final convolution result values of FIG. 6, according to an embodiment.

FIG. 13 is a flowchart illustrating an operation of determining first final convolution result values of FIG. 6, according to an embodiment.

Figure 14:
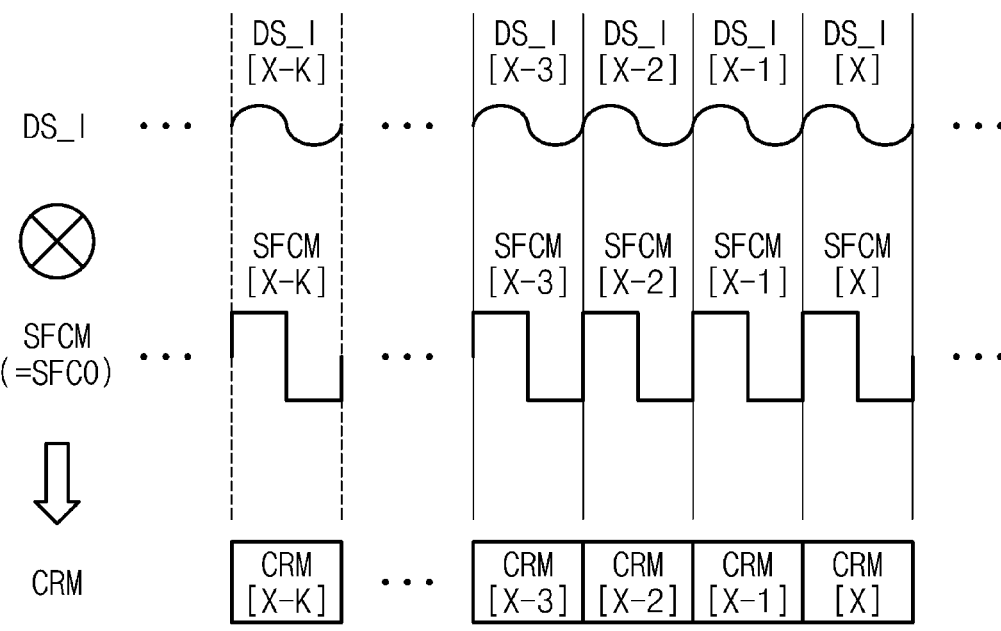

Referring to FIGS. 6 and 14, in operation S400, in which the first final convolution result values are determined, the type of the protocol may be determined (operation S411).

The first final convolution result values may be generated by selecting convolution result values corresponding to specific patterns of the first digital signal from among the first matched convolution result values based on the determined protocol type and changes in magnitudes of the first matched convolution result values (operation S413).

Figure 15:
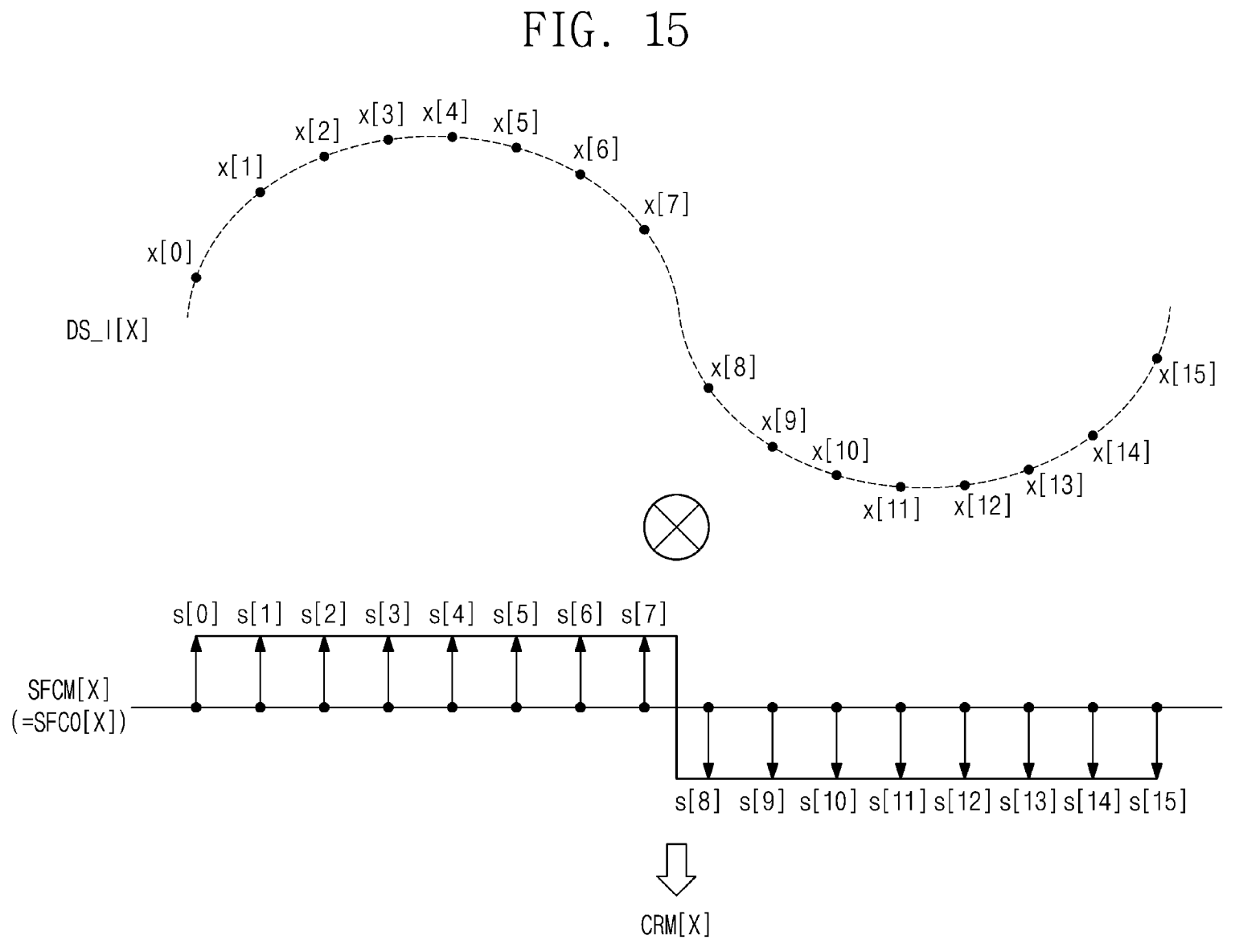

FIGS. 14 and 15 are diagrams depicting an example of first final convolution result values of FIG. 6, according to an embodiment. FIG. 16 is a diagram illustrating an embodiment of first convolution result data of FIG. 6, according to an embodiment.

The first digital signal DS_I described with reference to FIGS. 3 to 5 and the first sub-filter coefficient SFC0 described with reference to FIGS. 10 and 11 are illustrated in FIG. 14.

As described with reference to FIG. 5, the start pattern/preamble matched filter 510 may determine one of a plurality of first sub-matched filters respectively corresponding to a plurality of first sub-filter coefficients as a first final matched filter, based on a plurality of first convolution result values.

The start pattern/preamble matched filter 510 may determine first final convolution result values by selecting some of first matched convolution result values output from the first final matched filter based on a type of a protocol that an NFC device receiving an analog input signal uses.

Referring to FIGS. 10 and 14, one of the plurality of first sub-matched filters 710 to 740 corresponding to the plurality of first sub-filter coefficients SFC0 to SFC15 may be determined as the first final matched filter based on the plurality of first convolution result values CR0 to CR15. For example, as shown in FIG. 14, it may be assumed that the first sub-matched filter 710 is determined as the first final matched filter. In such an example, a convolution result value CRM that may be obtained by performing the convolution operation on the first digital signal DS_I and the first sub-filter coefficient SFC0 (e.g., SFCM) input to the first final matched filter may be output as the first matched convolution result values.

For example, the first digital signal DS_I may include DS_I[X], DS_I[X−1], DS_I[X−2], DS_I[X−3], to DS_I[X−K], K being positive integer greater than four (4). DS_I[X] to DS_I[X−K] may refer to digital signals that may be sequentially output from an analog-to-digital converter (e.g., analog-to-digital converter 311-7 or 313-7 of FIG. 4) included in a first channel (e.g., first channel 311 of FIG. 3). In DS_I[X] to DS_I[X−K], DS_I[X] may refer to a digital signal that is first output, and DS_I[X−K] may refer to another digital signal that is finally output.

For example, the first sub-filter coefficient SFCM may include SFCM[X], SFCM[X−1], SFCM[X−2], SFCM[X−3], to SFCM[X−K]. Each of SFCM[X] to SFCM[X−K] may be and/or may include the first sub-filter coefficient SFC0 input to the first final matched filter. That is, one first sub-filter coefficient SFC0 may be repeatedly illustrated to describe the convolution operation with each of DS_I[X] to DS_I[X−K]. For example, each of DS_I[X] to DS_I[X−K] and each of SFCM[X] to SFCM[X−K] may have the time interval corresponding to the sub-carrier period Ts_SC, as described with reference to FIG. 11.

In an embodiment, the convolution result value CRM[X] may be generated by performing the convolution operation on DS_I[X] and SFCM[X]. The convolution result value CRM[X−1] may be generated by performing the convolution operation on DS_I[X−1] and SFCM[X−1], and the convolution result value CRM[X−2] may be generated by performing the convolution operation on DS_I[X−2] and SFCM[X−2]. As described above, the convolution result value CRM[X−K] may be generated by performing the convolution operation on DS_I[X−K] and SFCM[X−K]. The convolution result values CRM[X] to CRM[X−K] may be the first matched convolution result values.

Referring to FIG. 15, the convolution result value CRM [X] may be obtained by performing the convolution operation on DS_I[X] and SFCM[X].

For example, DS_I[X] may include a plurality of values (e.g., first value x[0], second value x[1], third value x[2], fourth value x[3], fifth value x[4], sixth value x[5], seventh value x[6], eighth value x[7], ninth value x[8], tenth value x[9], eleventh value x[10], twelfth value x[11], thirteenth value x[12], fourteenth value x[13], fifteenth value x[14], and sixteenth value x[15]), and the first sub-filter coefficient SFC0 may include a corresponding plurality of sub-filter coefficients (e.g., first sub-filter coefficient s[0], second sub-filter coefficient s[1], third sub-filter coefficient s[2], fourth sub-filter coefficient s[3], fifth sub-filter coefficient s[4], sixth sub-filter coefficient s[5], seventh sub-filter coefficient s[6], eighth sub-filter coefficient s[7], ninth sub-filter coefficient s[8], tenth sub-filter coefficient s[9], eleventh sub-filter coefficient s[10], twelfth sub-filter coefficient s[11], thirteenth sub-filter coefficient s[12], fourteenth sub-filter coefficient s[13], fifteenth sub-filter coefficient s[14], and sixteenth sub-filter coefficient s[15]). The convolution result value CRM[X] may be generated as a result of performing the convolution operation on the plurality of values x[0] to x[15] and the sub-filter coefficients s[0] to s[15]. Each of the convolution result values CRM[X−1], CRM[X−2], CRM[X−3], to CRM[X−K] shown in FIG. 14 may be generated to be similar to the convolution result value CRM[X].

As described with reference to FIG. 9, the final convolution result values may be determined by selecting some of the first matched convolution result values output from the first final matched filter based on a type of a protocol that an NFC device uses.

In an embodiment, a start position and an end position of some selected convolution result values from the first matched convolution result values may be determined depending on the protocol type, and the number of first matched convolution result values selected from the first matched convolution result values may be determined depending on the protocol type.

In FIG. 16, in the first matched convolution result values CRM[X] to CRM[X−K], when K is seven (7), the first matched convolution result values CRM[X] to CRM[X−7] may be the first final convolution result values selected from the first matched convolution result values output from the first final matched filter based on the protocol type.

Referring to FIGS. 15 and 16, as the first final convolution result values, the first matched convolution result values CRM[X] to CRM[X−7] may be equal to 102, 103, 101, 99, 101, 99, 102, and 101.

In an embodiment, a channel selector (e.g., channel selector 350 of FIG. 3) may generate the first accumulated matched convolution result values CRM_ACCUM by sequentially accumulating (and/or adding) the first matched convolution result values CRM[X] to CRM[X−7] from CRM[X−7]. For example, CRM[X] to CRM[X−7] may be sequentially generated from CRM[X−7] to CRM[X]. Alternatively or additionally, the channel selector may generate the first accumulated matched convolution result values CRM_ACCUM whenever CRM[X] to CRM[X−7] are respectively generated. For example, as shown in FIG. 16, the first accumulated matched convolution result values CRM_ACCUM may be generated as having values 102, 205, 306, 405, 506, 605, 707, and 808, based on the CRM[X−7] to CRM[X] values.

In an embodiment, the channel selector may output 101, for example, as the first convolution result data CRD_I by averaging the first matched convolution result values CRM [X] to CRM[X−7]. However, the present disclosure is not limited thereto. In another embodiment, the channel selector may output one or more of the first final convolution result values and the first accumulated matched convolution result values CRM_ACCUM as the first convolution result data CRD_I without modification. In another embodiment, the channel selector may output one of a maximum value and a medium value among the first final convolution result values and the first accumulated matched convolution result values CRM ACCUM as the first convolution result data CRD_I.

FIGS. 17A, 17B, 18A, 18B, 19A, and 19B are diagrams depicting convolution result values included by first final convolution result values of FIG. 6, according to an embodiment.

As described with reference to FIG. 7, the protocol type may include Type A, Type B, Type F, and Type V.

As described with reference to FIG. 13, the first final convolution result values may be generated by selecting convolution result values corresponding to specific patterns of the first digital signal from among the first matched convolution result values based on the determined protocol type and the changes in magnitudes of the first matched convolution result values.

Figure 17A:
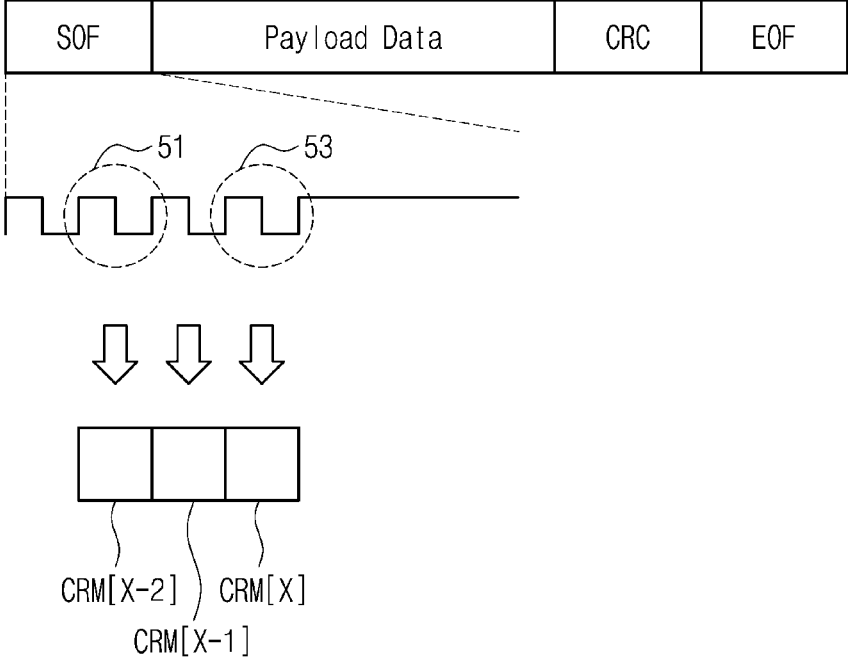
FIGS. 17A, 17B, 18A, 18B, 19A, and 19B are diagrams depicting convolution result values included by first final convolution result values of FIG. 6, according to an embodiment.
Figure 17B:
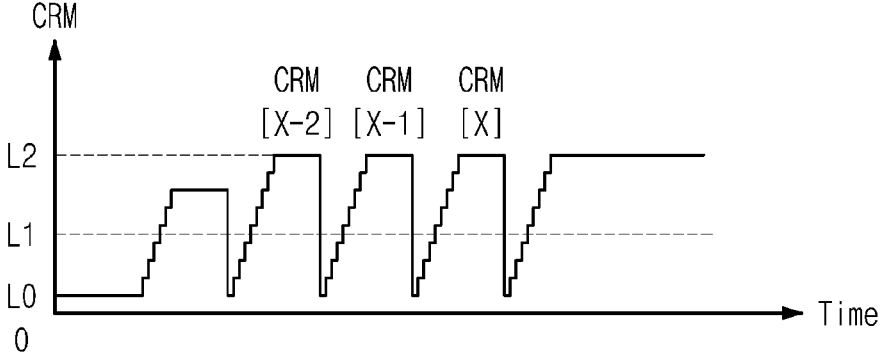

Referring to FIGS. 17A and 17B, when the protocol type is the first type (e.g., Type A), the first final convolution result values may include first matched convolution result values corresponding to patterns that appear in given turns (or orders) in a start pattern of a first digital signal (e.g., DS_I of FIGS. 3, 4, 5, and 10).

In an embodiment, when the protocol type is the first type, the first final convolution result values may include matched convolution result values corresponding to a pattern (e.g., region 51 of FIG. 17A) that appears second and a pattern that appears fourth (e.g., region 53 of FIG. 17A), in the start pattern of the first digital signal. For example, the convolution result values CRM[X−2], CRM[X−1], and CRM[X] may be selected as the first final convolution result values. In such an example, the number of first matched convolution result values selected from the first matched convolution result values may be three (3), a start position of the first matched convolution result values selected from the first matched convolution result values may be CRM[X−2], and an end position thereof may be CRM[X].

In an embodiment, the patterns that appear second and fourth in the start pattern may be determined based on one (e.g., L1 of FIG. 17B) of the values between an initial value (e.g., L0) and a maximum value (e.g., L2) of the first matched convolution result values. For example, L1 may be an average value of L0 and L2. However, the present disclosure is not limited in this regard, and the determined value may be selected using other criteria without departing from the scope of the present disclosure. For example, when one rise and one fall occurred with respect to L1 in the first matched convolution result values, it may be determined that a convolution result value corresponding to one pattern belonging to the start pattern is generated.

Figure 18A:
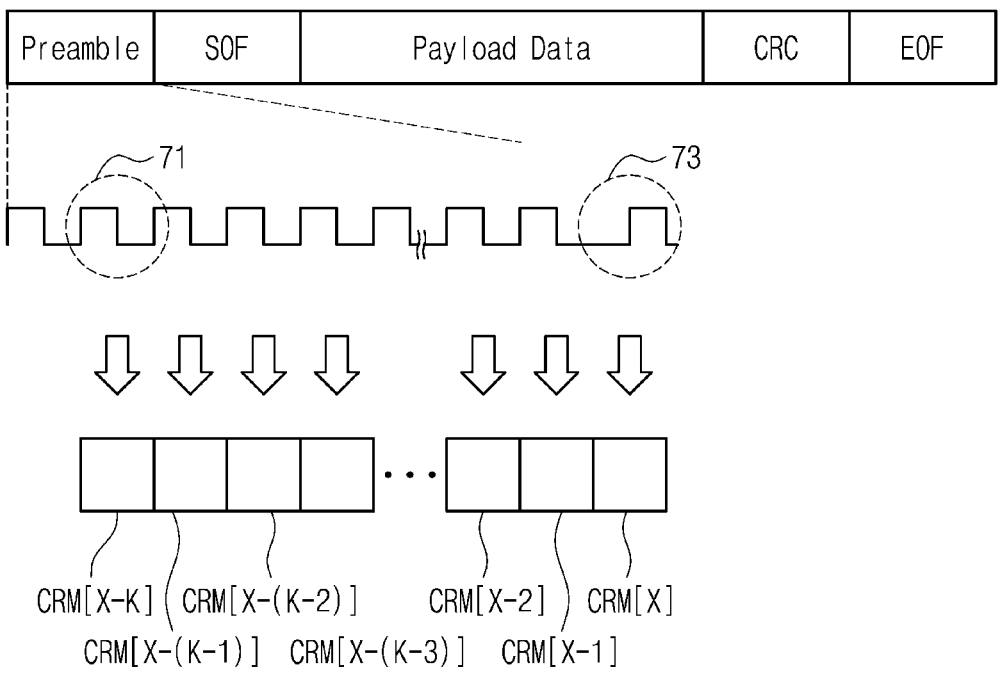
Figure 18B:
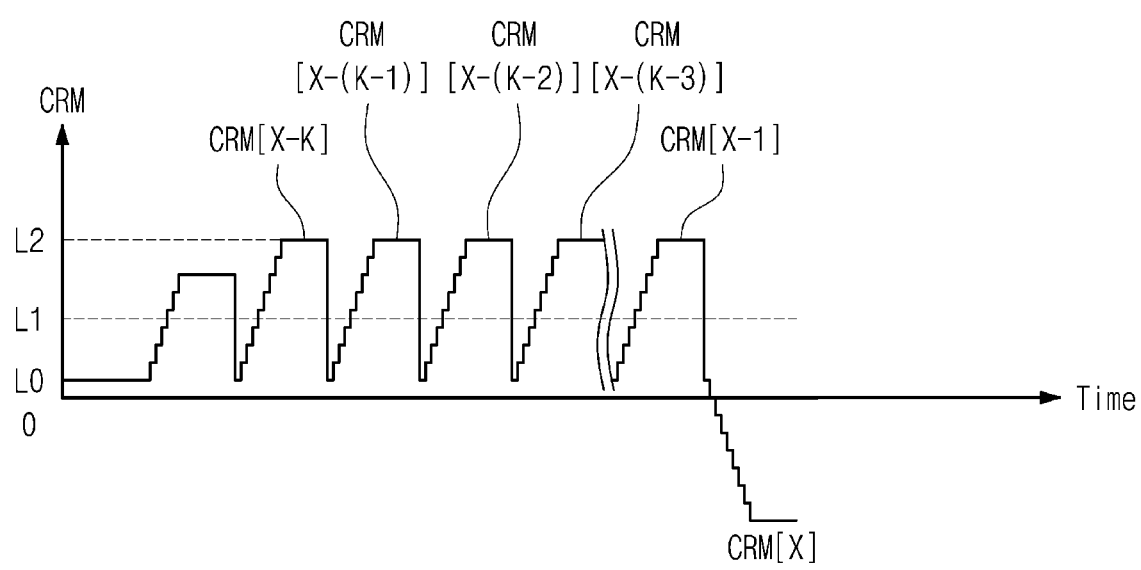

Referring to FIGS. 18A and 18B, when the protocol type is the second type (e.g., Type B) or the third type (e.g., Type F), the first final convolution result values may include first matched convolution result values corresponding from a pattern included in the start pattern of the first digital signal to a pattern with a specific shape of the first digital signal.

In an embodiment, when the protocol type is the second type or the third type, the first final convolution result values may include matched convolution result values corresponding from a pattern that appears second in the start pattern of the first digital signal to a pattern where phase shift is detected in the first digital signal. For example, the convolution result values CRM[X–K] to CRM[X] may be selected as the first final convolution result values. In such an example, the number of first matched convolution result values selected from the first matched convolution result values may be K+1, a start position of the first matched convolution result values selected from the first matched convolution result values may be CRM[X–K], and an end position thereof may be CRM[X].

In an embodiment, the pattern that appears second in the start pattern and the pattern where the phase shift is detected may be determined based on one of values between an initial value and a maximum value of the first matched convolution result values. That is, when one rise and one fall occurred with respect to L1 in the first matched convolution result values, it may be determined that a convolution result value corresponding to one pattern of the start pattern has occurred. For example, in the first matched convolution result values, when a value that is smaller than L0 and is negative is present, it may be determined that a convolution result value corresponding to the pattern where the phase shift is detected has occurred.

Figure 19A:
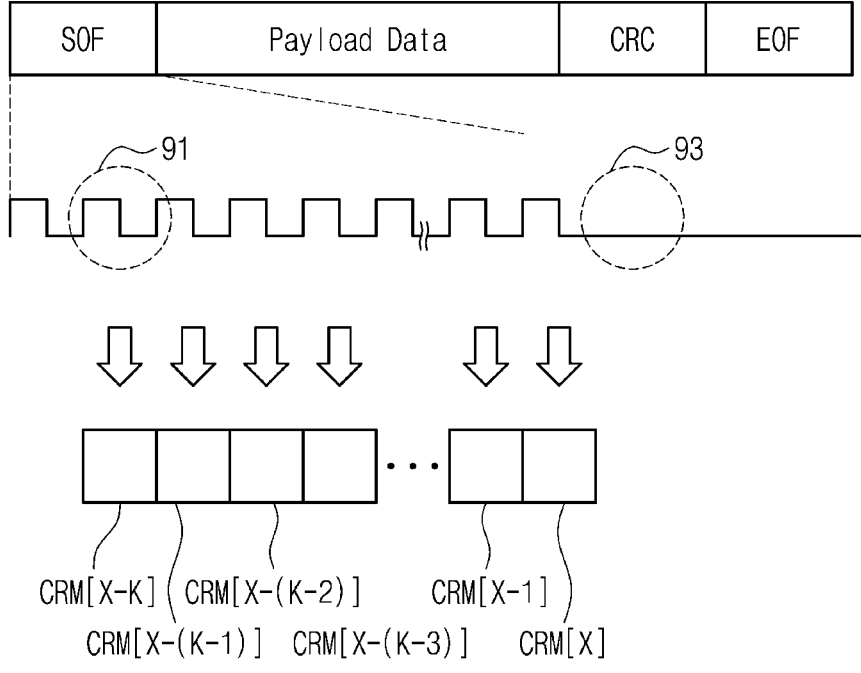
Figure 19B:
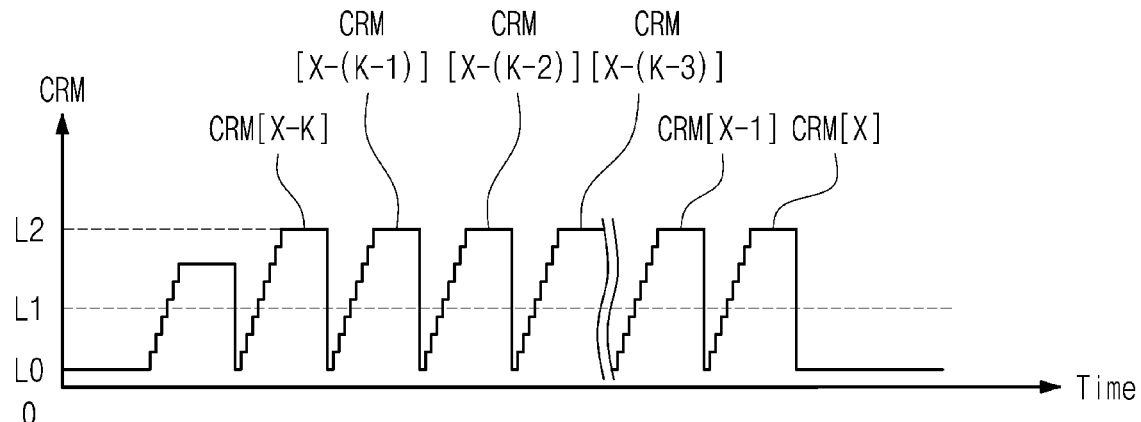

Referring to FIGS. 19A and 19B, when the protocol type is the fourth type (e.g., Type V), the first final convolution result values may include first matched convolution result values corresponding from a pattern included in the start pattern of the first digital signal to a pattern with a specific shape of the first digital signal.

In an embodiment, when the protocol type is the fourth type, the first final convolution result values may include convolution result values corresponding from a pattern that appears second in the start pattern of the first digital signal to a pattern where a non-modulation period starts in the first digital signal. For example, the convolution result values CRM[X–K] to CRM[X] may be selected as the first final convolution result values. In such an example, the number of first matched convolution result values selected from the first matched convolution result values may be K+1, a start position of the first matched convolution result values selected from the first matched convolution result values may be CRM[X–K], and an end position thereof may be CRM[X].

In an embodiment, the pattern that appears second in the start pattern and the pattern where the non-modulation period starts may be determined based on one of values between an initial value and a maximum value of the first matched convolution result values. That is, when one rise and one fall occurred with respect to L1 in the first matched convolution result values, it may be determined that a convolution result value corresponding to one pattern of the start pattern has occurred. For example, in the first matched convolution result values, when there are no further rises and falls with respect to L1 in the first matched convolution result values, it may be determined that a convolution result corresponding to a pattern where the non-modulation period starts has occurred.

Referring to FIGS. 17A, 17B, 18A, 18B, 19A, and 19B, the final convolution result values may not include convolution result values corresponding to a specific pattern of the start pattern of the first digital signal. In an embodiment, because the size of a pattern that appears first in the start pattern is smaller than the size of the remaining patterns, the final convolution result values may include only convolution result values corresponding to the remaining patterns other than the pattern that appears first in the start pattern of the first digital signal.

Figure 20:
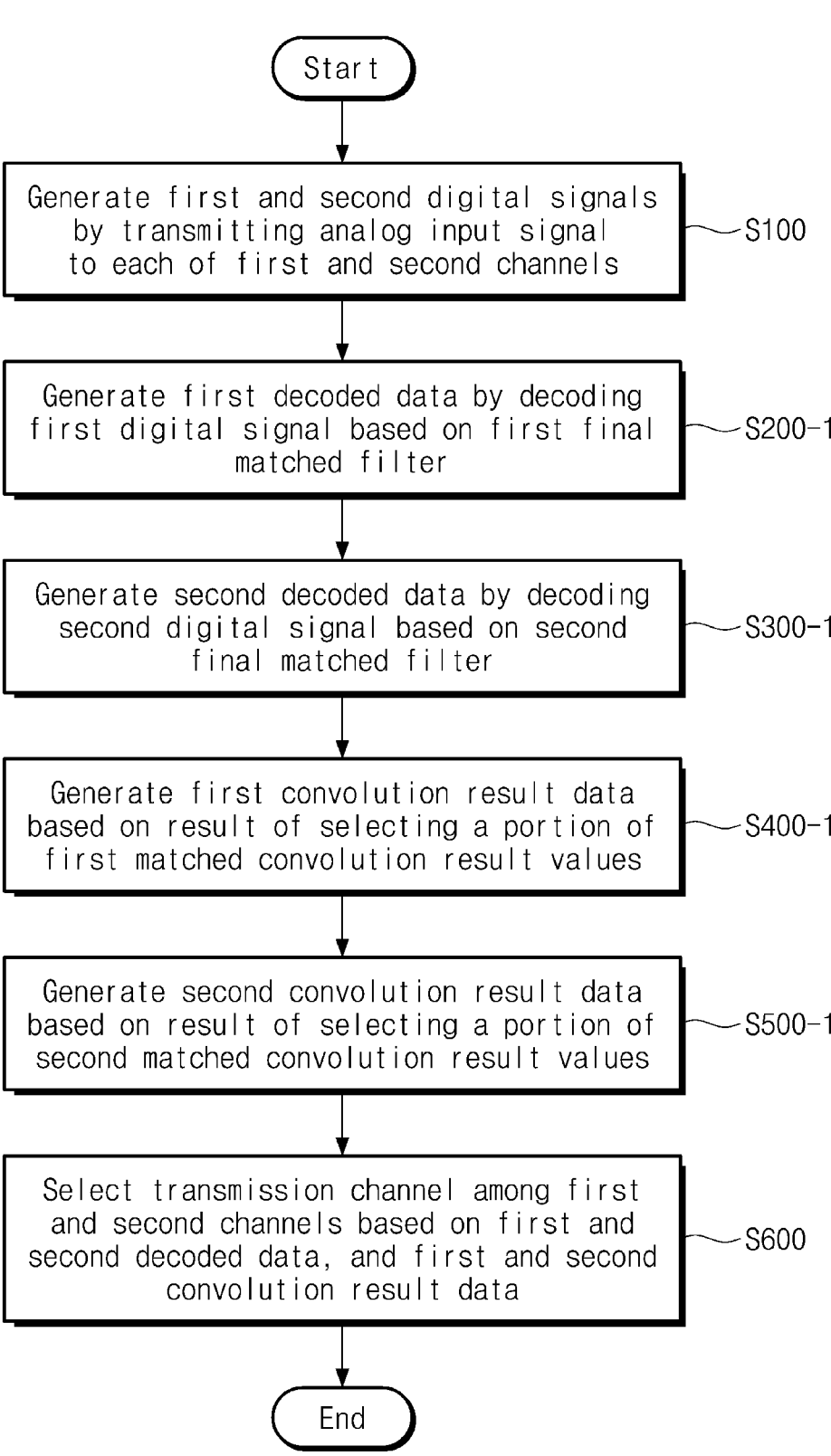
FIG. 20 is a flowchart illustrating a method of operating an NFC device, according to an embodiment.

FIG. 20 is a flowchart illustrating a method of operating an NFC device, according to an embodiment of the present disclosure.

Referring to FIGS. 1 and 20, in a method of operating an NFC device, as an analog input signal from the outside is transmitted to each of a first channel and a second channel, a first digital signal and a second digital signal may be generated (operation S100).

First decoded data may be generated by decoding the first digital signal based on a first final matched filter being one of a plurality of first sub-matched filters (operation S200-1). Second decoded data may be generated by decoding the second digital signal based on a second final matched filter being one of a plurality of second sub-matched filters (operation S300-1).

In an embodiment, the NFC device may include the plurality of first sub-matched filters and the plurality of second sub-matched filters. The plurality of first sub-matched filters may be implemented with the sub-matched filters 710 to 740 (as shown in FIG. 10), and the plurality of second sub-matched filters may be implemented with the sub-matched filters 710 to 740.

In an embodiment, the first final matched filter may be determined based on convolution result values generated by the plurality of first sub-matched filters. Alternatively or additionally, the second final matched filter may be determined based on convolution result values generated by the plurality of second sub-matched filters.

First convolution result data may be generated based on a result of selecting some of first matched convolution result values output from the first final matched filter (operation S400-1). Second convolution result data may be generated based on a result of selecting some of second matched convolution result values output from the second final matched filter (operation S500-1).

In an embodiment, some of the first matched convolution result values output from the first final matched filter may be selected depending on the protocol type, and some of the second matched convolution result values output from the second final matched filter may be selected depending on the protocol type. For example, a start position and an end position of some selected from the first matched convolution result values may be determined depending on the protocol type, and the number of first matched convolution result values selected from the first matched convolution result values may be determined depending on the protocol type. Similarly, a start position and an end position of some selected from the second matched convolution result values may be determined depending on the protocol type, and the number of second matched convolution result values selected from the second matched convolution result values may be determined depending on the protocol type.

A transmission channel among the first channel and the second channel may be selected based on the first decoded data, the second decoded data, the first convolution result data, and the second convolution result data (operation S600).

Figure 21:
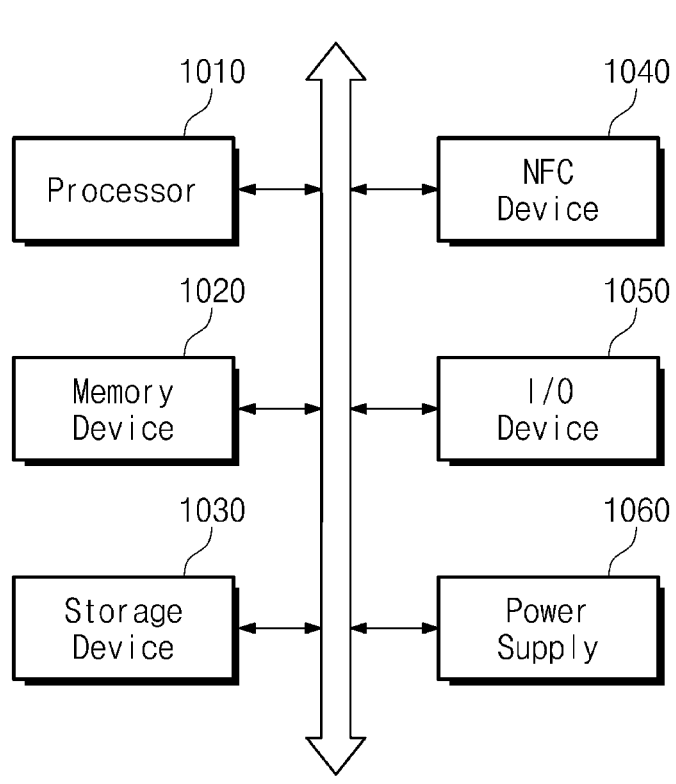
FIG. 21 is a block diagram illustrating a computing system, according to an embodiment.

FIG. 21 is a block diagram illustrating a computing system including an NFC device, according to embodiments of the present disclosure.

Referring to FIG. 21, a computing system 1000 may include a processor 1010, a memory device 1020, a storage device 1030, an NFC device 1040, an input/output (I/O) device 1050, and a power supply 1060. In an embodiment, the computing system 1000 may communicate with a video card, a sound card, a memory card, a universal serial bus (USB) device, and the like. Alternatively or additionally, the computing system 1000 may further include ports capable of communicating with other electronic devices.

The processor 1010 may perform specific calculations and/or tasks. In an embodiment, the processor 1010 may be and/or may include a micro-processor or a CPU.

The processor 1010 may communicate with the memory device 1020, the storage device 1030, the NFC device 1040, and the I/O device 1050 through an address bus, a control bus, a data bus, and the like.

In an embodiment, the processor 1010 may be connected to an expansion bus such as, but not limited to, a peripheral component interconnect (PCI) bus.

The memory device 1020 may store data needed for an operation of the computing system 1000. For example, the memory device 1020 may be implemented with at least one of a dynamic RAM (DRAM), a mobile DRAM, a static RAM (SRAM), a phase change RAM (PRAM), a ferroelectric RAM (FRAM), a resistive RAM (RRAM), and/or a magnetoresistive RAM (MRAM).

The storage device 1030 may be and/or may include a solid state drive (SSD), a hard disk drive (HDD), a compact disc read-only memory (CD-ROM), and the like. The I/O device 1050 may include input devices such as, but not limited to, a keyboard, a keypad, a mouse and/or output devices such as a printer and a display. The power supply 1060 may supply an operating voltage necessary for the operation of the computing system 1000.

The NFC device 1040 may perform short-range wireless communication with an external NFC device. The NFC device 1040 may correspond to the NFC device 100 of FIG. 2, may include the receiving module 300 of FIG. 3, and/or may operate based on the operating method according to embodiments of the present disclosure.

In an embodiment, the computing system 1000 may be an electronic system such as a personal computer (PC), a workstation, a laptop, a cellular phone, a smartphone, a Motion Pictures Expert Group (MPEG) Audio Layer III (MP3) player, a personal digital assistant (PDA), a portable multimedia player (PMP), a digital television (TV), a digital camera, a portable game console, a navigation system, a wearable device, an Internet of Things (IoT) device, an Internet of Everything (IoE) device, an electronic book (e-book), a virtual reality (VR) device, an augmented reality (AR) device, a drone, and/or the like.

As described above, a channel having potentially better reception performance from among a first channel and a second channel may be selected through the NFC device operating method according to an embodiment of the present disclosure.

When a distance from the external NFC device increases by a given level or more, a signal-to-noise ratio of a receive signal may decrease. In such a chase, a noise may be amplified by the quadrature demodulation. However, the NFC device according to an embodiment of the present disclosure may potentially reduce the noise amplification when compared to a related NFC device.

The NFC device may select a transmission channel in a digital scheme. The NFC device may select a transmission channel based on a plurality of decoded data and a plurality of convolution result data, and thus may improve reception performance compared to a related scheme to select a channel based on a toggle, a preamble, and the like.

While embodiments of the present disclosure have been described, it may be apparent to those of ordinary skill in the art that various changes and modifications may be made thereto without departing from the spirit and scope of the present disclosure as set forth in the following claims.

What is claimed is:

1. A method of operating a near field communication (NFC) device, the method comprising:
   generating a first digital signal based on an analog input signal received from an external device through a first channel, and generating a second digital signal based on the analog input signal received from the external device through a second channel having a phase difference with the first channel;
   generating first decoded data by decoding the first digital signal based on a plurality of first convolution result values obtained by performing a first convolution operation on the first digital signal and each of a plurality of first sub-filter coefficients;
   generating second decoded data by decoding the second digital signal based on a plurality of second convolution result values obtained by performing a second convolution operation on the second digital signal and each of a plurality of second sub-filter coefficients;
   generating first convolution result data based on the plurality of first convolution result values;
   generating second convolution result data based on the plurality of second convolution result values;
   selecting a transmission channel from among the first channel and the second channel based on the first decoded data, the second decoded data, the first convolution result data, and the second convolution result data; and
   performing communication with the external device based on the transmission channel.

2. The method of claim 1, wherein the selecting the transmission channel comprises, based on a first pattern being detected in the first decoded data prior to the second decoded data, selecting the first channel as the transmission channel.

3. The method of claim 2, further comprising determining the first pattern based on a protocol type used by the NFC device to receive the analog input signal.

4. The method of claim 3, wherein the first pattern comprises a start pattern corresponding to the protocol type, and
   wherein the first pattern further comprises payload data of a given size depending on the protocol type.

5. The method of claim 4, wherein, based on the protocol type being a first type, the first pattern comprises a first start pattern and first payload data of a first size,
   wherein, based on the protocol type being a second type, the first pattern comprises a second start pattern,
   wherein, based on the protocol type being a third type, the first pattern comprises a third start pattern, and
   wherein, based on the protocol type being a fourth type, the first pattern comprises a fourth start pattern.

6. The method of claim 5, wherein each of the first start pattern, the third start pattern, and the fourth start pattern comprises a start of communication pattern, and wherein the second start pattern comprises a SYNC pattern.

7. The method of claim 1, wherein the selecting the transmission channel comprises, based on a first pattern being detected in the second decoded data during a set time interval, and a second value of the second convolution result data being greater than a first value of the first convolution result data, selecting the second channel as the transmission channel, and wherein the set time interval starts at a time point at which the first pattern is detected in the first decoded data.

8. The method of claim 1, wherein the selecting the transmission channel comprises, based on a first pattern not being detected in the second decoded data during a set time interval, selecting the first channel as the transmission channel, and wherein the set time interval starts at a time point at which the first pattern is detected in the first decoded data.

9. The method of claim 1, wherein the selecting the transmission channel comprises:

determining whether a first pattern is detected in the first decoded data;

based on the first pattern being detected in the first decoded data, determining whether the first pattern is detected in the second decoded data within a set time interval that starts at a time point at which the first pattern is detected in the first decoded data; and based on the first pattern being detected in the second decoded data within the set time interval, comparing a first value of the first convolution result data and a second value of the second convolution result data.

10. The method of claim 1, wherein the generating the first decoded data comprises determining a first final matched filter from among a plurality of first sub-matched filters corresponding to the plurality of first sub-filter coefficients, based on the plurality of first convolution result values, and wherein the generating the first convolution result data comprises:

determining first final convolution result values by selecting a first portion of first matched convolution result values output from the first final matched filter, based on a protocol type used by the NFC device to receive the analog input signal; and generating the first convolution result data based on the first final convolution result values.

11. The method of claim 10, wherein the determining the first final convolution result values comprises:

determining the protocol type of the analog input signal; and generating the first final convolution result values by selecting convolution result values corresponding to patterns of the first digital signal from among the first matched convolution result values, based on the protocol type and changes in magnitudes of the first matched convolution result values.

12. The method of claim 11, wherein, based on the protocol type being a first type, the first final convolution result values comprise convolution result values corresponding from a pattern that appears second to another pattern that appears fourth, in a start pattern of the first digital signal, wherein, based on the protocol type being of a second type or a third type, the first final convolution result values comprise convolution result values corresponding from the pattern that appears second in the start pattern of the first digital signal to an a-th pattern of the first digital signal, the a-th pattern being a pattern where a phase shift is detected in the first digital signal, and wherein, based on the protocol type being a fourth type, the first final convolution result values comprise convolution result values corresponding from the pattern that appears second in the start pattern of the first digital signal to a b-th pattern of the first digital signal, the b-th pattern being a pattern where a non-modulation period starts in the first digital signal.

13. The method of claim 11, wherein the first final convolution result values comprise convolution result values corresponding to remaining patterns other than a pattern that appears first in a start pattern of the first digital signal.

14. The method of claim 10, wherein the generating of the first convolution result data comprises calculating the first convolution result data by adding the first final convolution result values.

15. The method of claim 1, wherein one of the first channel and the second channel is an I channel for quadrature demodulation, and wherein the other one of the first channel and the second channel is a Q channel for the quadrature demodulation.

16. A near field communication (NFC) device comprising:

a first channel configured to generate a first digital signal based on an analog input signal received from the outside;

a second channel having a phase difference with the first channel, and configured to generate a second digital signal based on the analog input signal;

a first receiver configured to:

generate first decoded data by decoding the first digital signal based on a plurality of first convolution result values obtained by performing a convolution operation on the first digital signal and each of a plurality of first sub-filter coefficients; and generate first convolution result data based on the plurality of first convolution result values;

a second receiver configured to:

generate second decoded data by decoding the second digital signal based on a plurality of second convolution result values obtained by performing the convolution operation on the second digital signal and each of a plurality of second sub-filter coefficients; and generate second convolution result data based on the plurality of second convolution result values; and a channel selector configured to select a transmission channel from among the first channel and the second channel based on the first decoded data, the second decoded data, the first convolution result data, and the second convolution result data.

* * * * *